(12) United States Patent
Kato et al.

(10) Patent No.: US 10,326,895 B2
(45) Date of Patent: *Jun. 18, 2019

(54) INFORMATION PROVIDING DEVICE, IMAGE FORMING DEVICE, AND TRANSMISSION SYSTEM FOR PROVIDING IMAGE DATA TO A TRANSMISSION TERMINAL THAT PERFORMS VIDEO COMMUNICATION

(71) Applicant: RICOH COMPANY, LTD., Tokyo (JP)

(72) Inventors: Yoshinaga Kato, Kanagawa (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 15/480,457

(22) Filed: Apr. 6, 2017

(65) Prior Publication Data

US 2017/0214809 A1 Jul. 27, 2017

Related U.S. Application Data

(63) Continuation of application No. 14/566,381, filed on Dec. 10, 2014, now Pat. No. 9,661,162, which is a
(Continued)

(30) Foreign Application Priority Data

Mar. 21, 2012 (JP) ................................. 2012-064516

(51) Int. Cl.
*H04N 1/00* (2006.01)
*H04N 1/32* (2006.01)
(Continued)

(52) U.S. Cl.
CPC ....... *H04N 1/00299* (2013.01); *H04N 1/0044* (2013.01); *H04N 1/00217* (2013.01);
(Continued)

(58) Field of Classification Search
CPC .. H04N 1/00299; H04N 1/21; H04N 1/32432; H04N 1/00217; H04N 1/00225; H04N 1/00244
See application file for complete search history.

(56) References Cited

U.S. PATENT DOCUMENTS

| 6,876,461 B2 | 4/2005 | Usami |
|---|---|---|
| 8,749,823 B2 | 6/2014 | Kato |

(Continued)

FOREIGN PATENT DOCUMENTS

| CN | 1327190 A | 12/2001 |
|---|---|---|
| CN | 102356627 A | 2/2012 |

(Continued)

OTHER PUBLICATIONS

Extended European Search Report dated Jul. 25, 2013 in Patent Application No. 13156055.9.
(Continued)

*Primary Examiner* — Ming Y Hon
(74) *Attorney, Agent, or Firm* — Oblon, McClelland, Maier & Neustadt, L.L.P.

(57) ABSTRACT

An information providing device is capable of communicating with an image forming device, a data managing device, and a transmission terminal. The information providing device includes a storage unit; a communication unit that transmits a forming instruction to instruct the image forming device to perform image forming, and receives, from the image forming device, storage location information indicating the data managing device that stores data obtained by image forming by the image forming device and indicating a storage location in the data managing device; and a storage location managing unit that generates, in the storage unit, management information in which identification information of the image data is associated with the storage location information. The communication unit receives the
(Continued)

data saved in the storage location indicated by the storage location information from the data managing device and transmits the received data to the transmission terminal.

13 Claims, 26 Drawing Sheets

Related U.S. Application Data continuation of application No. 13/769,991, filed on Feb. 19, 2013, now Pat. No. 8,947,711.

(51) Int. Cl.
*H04N 1/327* (2006.01)
*H04N 7/15* (2006.01)
*H04N 1/21* (2006.01)

(52) U.S. Cl.
CPC ..... *H04N 1/00225* (2013.01); *H04N 1/00244* (2013.01); *H04N 1/00307* (2013.01); *H04N 1/00347* (2013.01); *H04N 1/00413* (2013.01); *H04N 1/00973* (2013.01); *H04N 1/21* (2013.01); *H04N 1/324* (2013.01); *H04N 1/32432* (2013.01); *H04N 1/32776* (2013.01); *H04N 7/15* (2013.01); *H04N 1/00411* (2013.01); *H04N 2201/006* (2013.01); *H04N 2201/0036* (2013.01); *H04N 2201/0039* (2013.01); *H04N 2201/0041* (2013.01); *H04N 2201/0044* (2013.01); *H04N 2201/0055* (2013.01); *H04N 2201/0075* (2013.01); *H04N 2201/0094* (2013.01); *H04N 2201/0096* (2013.01)

(56) References Cited

U.S. PATENT DOCUMENTS

| | | | |
|---|---|---|---|
| 2002/0075281 | A1 | 6/2002 | Suzuki et al. |
| 2002/0143752 | A1 | 10/2002 | Plunkett et al. |
| 2003/0184647 | A1 | 10/2003 | Yonezawa et al. |
| 2004/0145654 | A1 | 7/2004 | Motohashi |
| 2004/0190019 | A1 | 9/2004 | Li |
| 2004/0233475 | A1* | 11/2004 | Mikuni .............. H04N 1/00281 358/1.15 |
| 2006/0152575 | A1* | 7/2006 | Amiel .................... H04N 7/147 348/14.01 |
| 2006/0209333 | A1* | 9/2006 | Takida ................. G07C 13/02 358/1.15 |
| 2006/0262359 | A1* | 11/2006 | Lee .................... H04N 1/00222 358/474 |
| 2008/0081666 | A1 | 4/2008 | Masera et al. |
| 2008/0162635 | A1 | 7/2008 | Keren |
| 2008/0252944 | A1* | 10/2008 | Otsuka ............... H04N 1/00413 358/474 |
| 2008/0305813 | A1 | 12/2008 | Rao |
| 2009/0033972 | A1 | 2/2009 | Kato |
| 2009/0052348 | A1 | 2/2009 | Kato et al. |
| 2009/0109276 | A1 | 4/2009 | Kim |
| 2010/0208031 | A1 | 8/2010 | Lee |
| 2011/0069353 | A1 | 3/2011 | Sawayanagi et al. |
| 2011/0109716 | A1 | 5/2011 | Choi |
| 2011/0153729 | A1 | 6/2011 | Kawai et al. |
| 2011/0216699 | A1 | 9/2011 | Umehara et al. |
| 2012/0069132 | A1 | 3/2012 | Kato |
| 2012/0314239 | A1 | 12/2012 | Nash |

FOREIGN PATENT DOCUMENTS

| | | |
|---|---|---|
| EP | 2 323 383 A2 | 5/2011 |
| JP | 2009-98903 A | 5/2009 |
| JP | 2009-135865 | 6/2009 |
| JP | 2011-87226 A | 4/2011 |
| JP | 2012-085269 | 4/2012 |
| WO | WO 2008/1360220 A2 | 11/2008 |

OTHER PUBLICATIONS

Office Action dated Dec. 10, 2015, in Chinese Patent Application No. 201310180228.9 (with English-language translation).

Office Action dated Mar. 9, 2016, in European Patent Application No. 13156055.9.

Hoadley, C., "A Very Short Introduction to UNIX", XP002330389, The Metropolitan State College of Denver: Information Technology Center for Technology Services; http://clem.mscd.edu/hoadleyc/papers/ShortIntroductionToUNIX.pdf; Apr. 30, 2002; 18 pages.

* cited by examiner

| DATA NUMBER | TERMINAL ID |
|---|---|
| 1 | TRANSMISSION TERMINAL 10aa |
| 2 | TRANSMISSION TERMINAL 10ba |
| 3 | TRANSMISSION TERMINAL 10ca |
| ... | ... |

| USER ID | PASSWORD |
|---|---|
| COMMUNICATION | ++++++ |
| TRIANGLE | ------ |
| RICOH-100 | ****** |
| ... | ... |

FIG.10

| NUMBER | URL |
|---|---|
| 1 | https://dataserver.xxx.co.jp/conference/doc/strategy.pdf |
| 2 | https://dataserver.xxx.co.jp/conference/doc/balance_sheet.pdf |
| 3 | https://dataserver2.xxx.co.jp/conference/doc/competitor_list.pdf |
| ... | ... |

FIG.11

| AUTHENTICATION ID | PRINTER ID | SCANNER ID |
|---|---|---|
| PERSON 1 | PERMITTED | PERMITTED |
| PERSON 2 | NOT PERMITTED | PERMITTED |
| ⋮ | ⋮ | ⋮ |

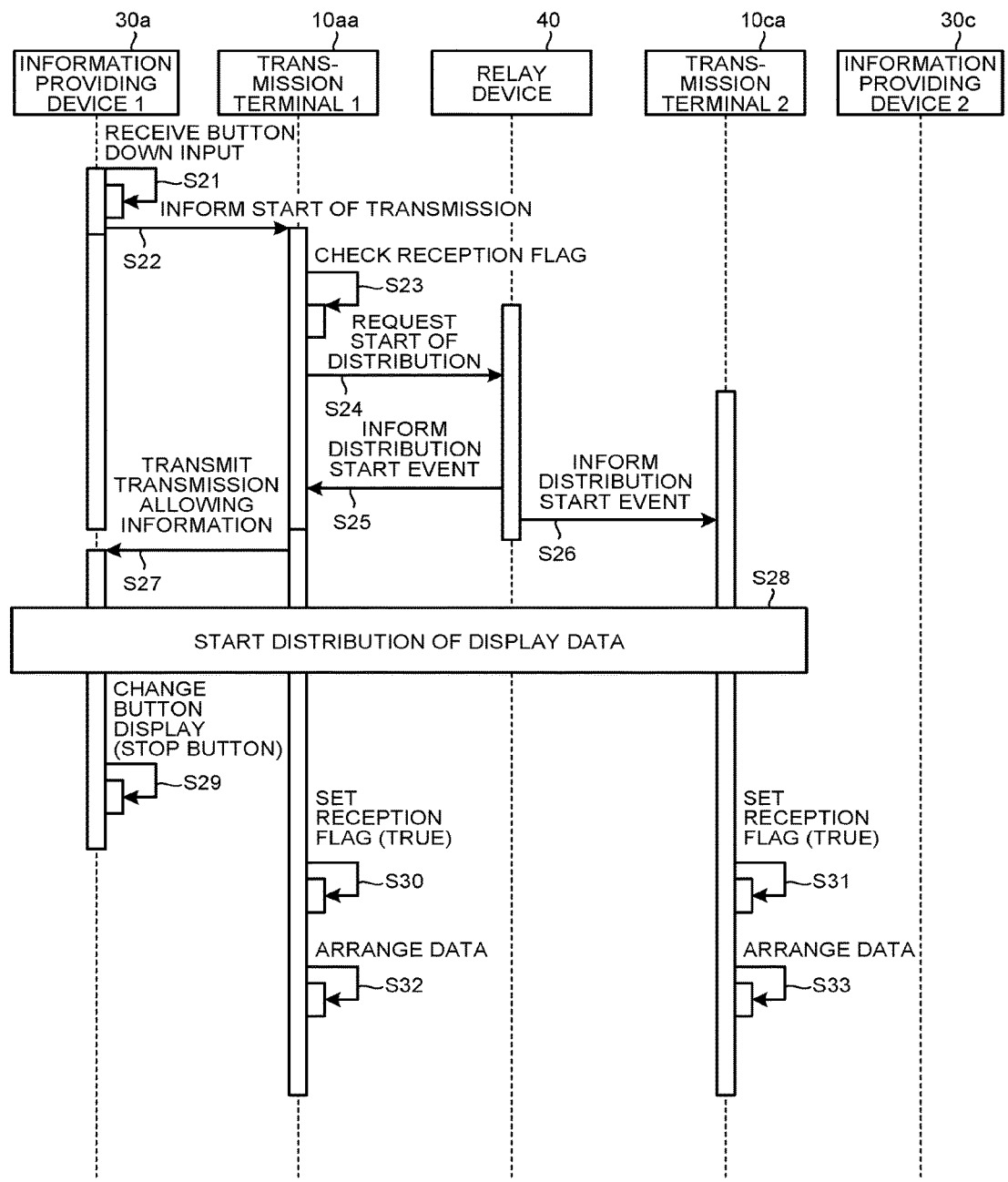

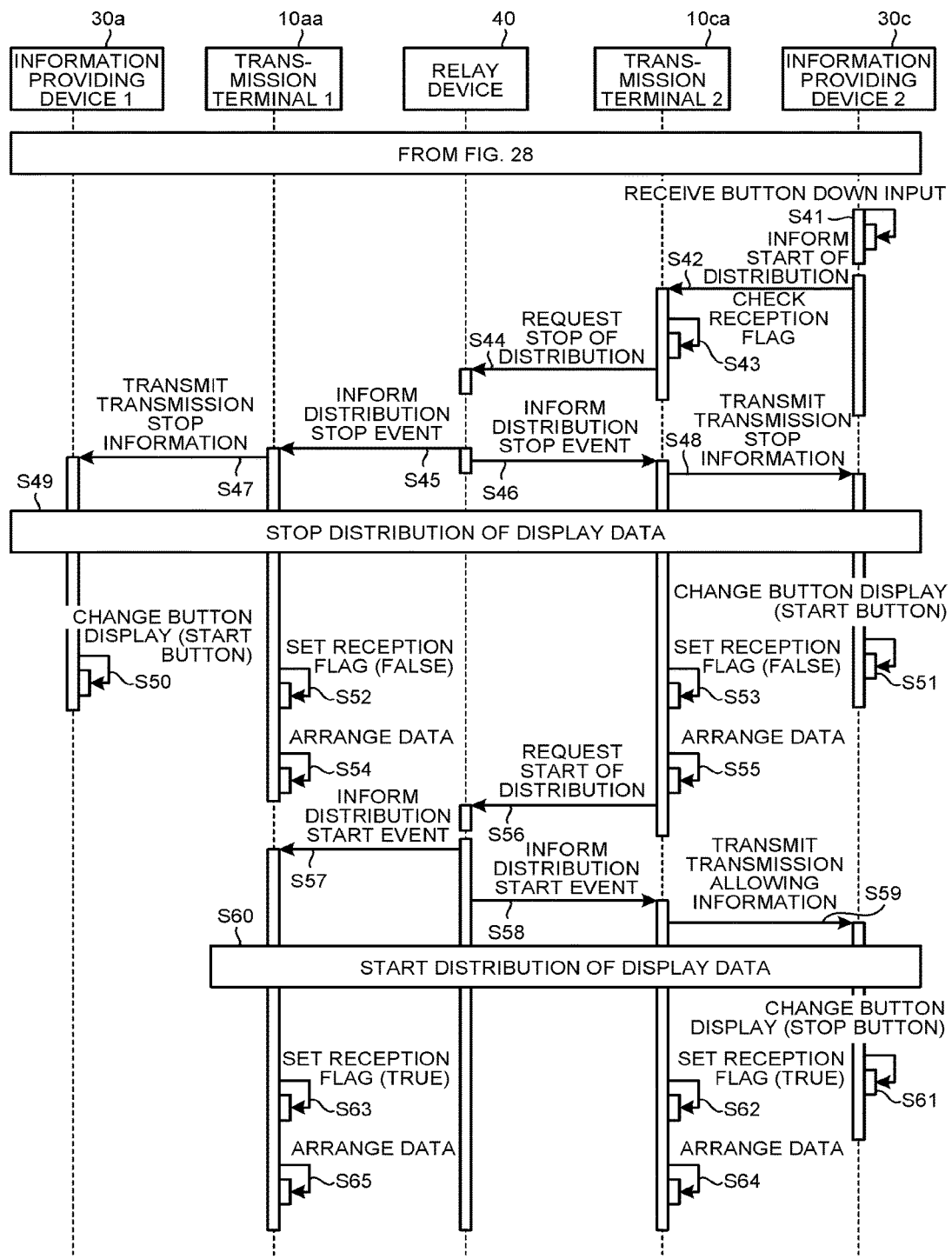

INFORMATION PROVIDING DEVICE, IMAGE FORMING DEVICE, AND TRANSMISSION SYSTEM FOR PROVIDING IMAGE DATA TO A TRANSMISSION TERMINAL THAT PERFORMS VIDEO COMMUNICATION

CROSS-REFERENCE TO RELATED APPLICATIONS

The present application is a continuation application of and claims the benefit of priority under 35 U.S.C. § 120 from U.S. application Ser. No. 14/566,381, filed Dec. 10, 2014, which is a continuation of U.S. application Ser. No. 13/769,991, now U.S. Pat. No. 8,947,711, filed Feb. 19, 2013, which is based upon and claims the benefit of priority under 35 U.S.C. § 119 from Japanese Patent Application No. 2012-064516 filed in Japan on Mar. 21, 2012, the entire contents of all of which are incorporated herein by reference.

BACKGROUND OF THE INVENTION

1. Field of the Invention

The present invention relates to an information providing device, an image forming device, and a transmission system.

2. Description of the Related Art

Communication systems for conducting conferences and the like via communication networks such as the Internet have been commonly used in recent years. In such a communication system, communication terminals each having a camera, a microphone, a speaker and the like are used. When a communication terminal starts communication with another communication terminal, the communication terminals are configured to transmit/receive captured image data (image data) and audio data acquired by cameras and microphones of their respective communication terminals so as to allow a video conference to be performed.

In the communication system described above, screens of presentation materials or the like displayed on the communication terminals may also be transmitted/received as display data in addition to the data mentioned above so as to improve mutual understanding with other conference participants. Then, the communication terminals that have received the display data display the display data on display devices, which allows the presentation materials or the like to be shared among the communication terminals.

For example, Japanese Patent Application Laid-open No. 2009-135865 discloses an information processing device that establishes a second communication unit by using setting information on the second communication unit received by a first communication unit and transmits data of a read document to a portable terminal device via the second communication unit for the purpose of easily establishing wireless communication and easily processing transmitted/received data.

A large number of operating procedures is required and it is thus troublesome to share document data read from a scanner. For example, a case in which a user of remote conferencing brings paper materials distributed at an off-site conference back to his/her office and shares the materials in a remote conference is assumed. In this case, the user needs to read the brought paper materials with a network scanner and save the electronic data in a portable terminal via a corporate LAN.

For data transmission from a scanner to a portable terminal in related art, however, the user first needs to perform operation of specifying a destination at the scanner and then perform read operation. The user further needs to perform operation of searching for the location in the portable terminal where the received data are saved and then starting application software allowing the data to be displayed.

There is a need for an information providing device, an image forming device, and a transmission system capable of easily sharing image data formed by the image forming device.

SUMMARY OF THE INVENTION

According to an embodiment, there is provided an information providing device capable of communicating with an image forming device, a data managing device, and a transmission terminal. The information providing device includes a storage unit; a communication unit that transmits a forming instruction to instruct the image forming device to perform image forming, and receives, from the image forming device, storage location information indicating the data managing device that stores data obtained by image forming by the image forming device and indicating a storage location in the data managing device; and a storage location managing unit that generates, in the storage unit, management information in which identification information of the image data is associated with the storage location information. The communication unit receives the data saved in the storage location indicated by the storage location information from the data managing device and transmits the received data to the transmission terminal.

According to still another embodiment, there is provided an image forming device capable of communicating with an information providing device and a data managing device. The image forming device includes a scanning unit that reads a paper document; a communication unit that receives, from the information providing device, a forming instruction to instruct image forming; an image forming unit that performs image forming of the paper document read by the scanning unit to generate image data according to the forming instruction; and a storage location information managing unit that generates storage location information indicating the data managing device that stores the data and a storage location set in advance in the data managing device. The communication unit transmits the data to the data managing device, and further transmits the storage location information to the information providing device.

According to still another embodiment, there is provided a transmission system including an image forming device, an information providing device, a data managing device and a transmission terminal. The image forming device includes first communication unit that receives, from the information providing unit, a forming instruction to instruct image forming; an image forming unit that performs image forming according to the forming instruction; and a storage location information managing unit that generates storage location information indicating the data managing device that stores the data and a storage location set in advance in the data managing device. The first communication unit transmits the data to the data managing device, and further transmits the storage location information to the information providing device. The information providing device includes a storage unit; a second communication unit that transmits a forming instruction to instruct the image forming device to perform image forming, and receives, from the image forming device, storage location information indicating the data managing device that stores data obtained by image forming by the image forming device and indicating a storage location in the data managing device; and a storage location managing unit that generates, in the storage unit, management information in which identification information of the data is associated with the storage location information. The second communication unit receives the data saved in the storage location indicated by the storage location information from the data managing device, and transmits the received data to the transmission terminal. The transmission terminal receives the data from the information providing device, and shares the received data.

According to still another embodiment, there is provided a computer program product including a non-transitory computer-readable medium having a computer-readable program for performing file control of data generated by an image forming device. The program causes a computer including a storage unit to execute transmitting a forming instruction to instruct an image forming device to perform image forming; receiving, from the image forming device, storage location information indicating a data managing device that stores data obtained by image forming by the image forming device and including a storage location in the data managing device; generating, in the storage unit, management information in which identification information of the data is associated with the storage location information; receiving the data stored in the storage location indicated by the storage location information from the data managing device; and transmitting the received data to a transmission terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of a management table stored in a storage unit of the transmission terminal;

FIG. 7 is a diagram illustrating an example of an authentication table stored in the storage unit of the transmission terminal;

FIG. 10 is an explanatory diagram illustrating an example of a file management table;

FIG. 11 is an explanatory diagram illustrating an example of a data structure in an authentication data storage unit of the MFP;

FIG. 28 is a diagram for explaining procedures of a process for transmitting display data from the information providing device;

FIG. 30 is a diagram for explaining procedures of a process for switching a transmission source of display data.

DETAILED DESCRIPTION OF THE PREFERRED EMBODIMENTS

Embodiments will be described in detail below with reference to the accompanying drawings.

Figure 1:
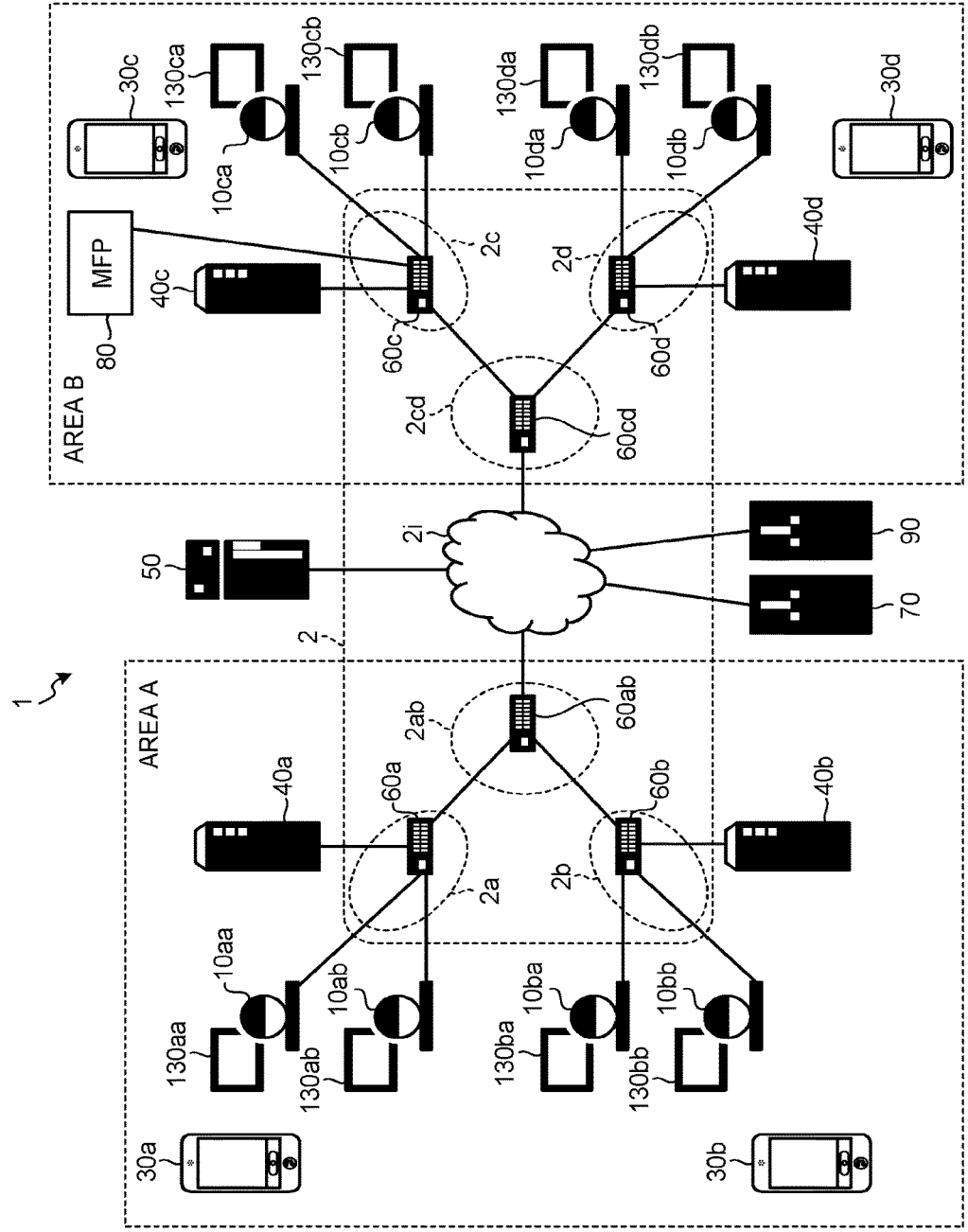
FIG. 1 is a diagram illustrating an example of a configuration of a transmission system according to an embodiment.

FIG. 1 is a diagram illustrating an example of a configuration of a transmission system according to the embodiment. An outline of the embodiment will be first described with reference to FIG. 1. Note that a transmission system capable of conducting a remote conference between places separated by a great distance will be described in the embodiment.

Examples of the transmission system include a data providing system in which one transmission terminal transmits content data one-way to another transmission terminal via a transmission management system, and a communication system in which information, feelings and the like are mutually transmitted among a plurality of transmission terminals via a transmission management system.

The communication system is a system for mutually transmitting information, feelings and the like among a plurality of communication terminals (corresponding to "transmission terminals") via a communication management system (corresponding to a "transmission management system"), and examples thereof include a teleconference system, a videophone system, an audio teleconference system, a voice call system, and a personal computer (PC) screen sharing system.

In the embodiment, a transmission system, a transmission management system and a transmission terminal will be described assuming a teleconference system as an example of the communication system, a teleconference management system as an example of the communication management system, and a teleconference terminal as an example of a communication terminal. Thus, the information providing device and the transmission system according to the present invention are also applied to a communication system or a transmission system in addition to a teleconference system. Note that a teleconference system may also be referred to as a video conference system.

A transmission system 1 illustrated in FIG. 1 includes a plurality of transmission terminals (10*aa*, 10*ab*, 10*ba*, 10*bb*, 10*ca*, 10*cb*, 10*da*, 10*db*), displays (130*aa*, 130*ab*, 130*ba*, 130*bb*, 130*ca*, 130*cb*, 130*da*, 130*db*) for the respective transmission terminals, information providing devices (30*a*, 30*b*, 30*c*, 30*d*) that cooperate with the transmission terminals and provide information, relay devices (40*a*, 40*b*, 40*c*, 40*d*), a multifunctional peripheral (MFP) 80 (hereinafter may simply referred to as an "MFP 80") as an image forming device, a transmission management system 50, routers (60*a*, 60*b*, 60*ab*, 60*c*, 60*d*, 60*cd*), a program providing system 70 and a data managing device 90.

In the embodiment, a "transmission terminal 10" will be used to refer to a certain one of the transmission terminals (10*aa*, 10*ab*, . . . ), a "display 130" will be used to refer to a certain one of the displays (130*aa*, 130*ab*, . . . ), an "information providing device 30" will be used to refer to a certain one of the information providing devices (30*a*, 30*b*, . . . ), a "relay device 40" will be used to refer to a certain one of the relay devices (40*a*, 40*b*, 40*c*, 40*d*), and a "router 60" will be used to refer to a certain one of the routers (60*a*, 60*b*, 60*c*, The numbers of terminals and devices are not limited to those in the example of FIG. 1.

A transmission terminal 10 transmits conference information such as image data (captured image data and display data that will be described later) and audio data for conducting conversation with other transmission terminals 10. Specifically, conversation in the embodiment includes not only transmission/reception of audio data but also transmission/reception of image data.

Note that, in the conversation (remote conference) conducted by using the transmission terminals 10, examples of the conference information include things (such as product samples) presented to participants of the conference, profiles of the participants, distributed materials, and material images that are not distributed but displayed by a display device such as a projector on equipment other than the displays 130 of the transmission terminals 10. The conference information thus refers to information that participants can have at a conference where the participants meet face-to-face. The conference information may include both of image data and audio data or may include at least one of these. When the conference information only includes image data, for example, speech of participants may be presented as subtitles in images. While a case in which images of the image data are moving images will be described in the embodiment, the images may be static images or may include both moving images and static images.

The information providing devices 30 are, for example, portable devices such as mobile phones, notebook personal computers (PCs) and smart phones that can be carried about. An information providing device 30 communicates with the transmission terminals 10 and the MFP 80 by using two types of communication methods with different communication distances, and transmits (provide) display data representing screens displayed on a display 306, which will be described later), of the information providing device 30 to the transmission terminals 10. Note that screen display is performed by executing a software program (such as document preparation software, spreadsheet software or presentation software) that is installed in the information providing device 30 in advance at the information providing device 30. A screen refers to data such as a static image or a moving image displayed on the display 306, which will be described later, of the information providing device 30. While one information providing device 30 is provided in each base (office) in FIG. 1, it is assumed that the information providing device 30 can be connected to transmission terminals 10 at any base when the user (owner) of the information providing device 30 moves.

The MFP 80 has a copy function, a scan function, a printing function, a facsimile function, and a document box function. The MFP 80 in the embodiment may be any MFP that has the scan function and the printing function and may not have any other function, or may be a scanner.

The data managing device 90 stores various data such as data generated by the MFP 80. The data managing device 90 also transmits data stored therein to an information providing device 30 or the like in response to a request from the information providing device 30.

In the embodiment, a user brings the information providing device 30 close to the MFP 80, and instructs the MFP 80 to scan a document to be scanned from the information providing device 30 to make the MFP 80 scan the document to be scanned. The MFP 80 stores data of the document resulting from the scanning at a predetermined location in the data managing device 90, and transmits storage location information representing the location in the data managing device 90 where the data are stored to the information providing device 30. The information providing device 30 receives the storage location information and registers a file name of the data and the storage location information in association with each other in a file management table therein. The information providing device 30 then accesses the data managing device 90 to receive the data stored in the storage location in the data managing device 90 in response to operation performed by the user. The user then brings the information providing device 30 close to a transmission terminal 10, selects data to be shared from the information providing device 30, and transmits the selected data to the transmission terminal 10. The transmission terminal 10 shares the data at an electronic conference.

The relay devices 40 are relay devices that relay communication among the transmission terminals 10. Specifically, a relay device 40 relays conference information transmitted/received among a plurality of transmission terminals 10 to the respective transmission terminals 10 in a conversation (remote conference) conducted using the transmission terminals 10. When reception of conference information such as captured image data is delayed among other transmission terminals 10 with which a transmission terminal 10 conducts conversation, the relay device 40 changes the resolution of image data to reduce the amount of information and then transmits the image data to the other transmission terminals 10. In this manner, the delay is eliminated and the simultaneity of the conference and the communication of conference information is ensured. Note that a known technology can be used for the method for changing the resolution depending on the amount of delay.

The transmission management system 50 manages the transmission terminals 10 and the relay devices 40 in an integrated fashion. Specifically, the transmission management system 50 manages communication states of the transmission terminals 10 and the relay devices 40 in an integrated fashion. For example, the transmission management system 50 interacts with the transmission terminals 10 and the relay devices 40 to manage registration of the transmission terminals 10 in the transmission system 1, manage terminal IDs and IP addresses of the transmission terminals 10, manage accounting for use, inform each transmission terminal 10 of other information terminals 10 that the transmission terminal 10 can communicate with, gain use states of the respective transmission terminals 10, and the like. The transmission management system 50 also informs the state (such as unconnected, logged-in, or in conference) of each transmission terminal 10 to the respective other transmission terminals 10.

The routers 60 are routing devices that interconnect networks, and select paths optimum for transmitting/receiving conference information (image data and audio data).

The program providing system 70 includes a hard disk (HD), which is not illustrated, having programs for transmission terminals stored therein for causing the transmission terminals 10 to implement various functions or causing the transmission terminals 10 to function as various means, and can transmit the programs for transmission terminals to the transmission terminals 10. The HD of the program providing system 70 also has stored therein programs for information providing devices for causing the information providing devices 30 to implement various functions or causing the information providing devices 30 to function as various means, and can transmit the programs for information providing devices to the information providing devices 30. The HD of the program providing system 70 also has stored therein programs for relay devices for causing the relay devices 40 to implement various functions or causing the relay devices 40 to function as various means, and can transmit the programs for relay devices to the relay devices 40. Furthermore, the HD of the program providing system 70 also has stored therein programs for conversation management for causing the transmission management system 50 to implement various functions or causing the transmission management system 50 to function as various means, and can transmit the programs for conversation management to the transmission management system 50.

The transmission terminals (10aa, 10ab), the relay device 40a and the router 60a are connected via a LAN 2a in a manner capable of communicating with one another. The transmission terminals (10ba, 10bb), the relay device 40b and the router 60b are connected via a LAN 2b in a manner capable of communicating with one another. The LAN 2a and the LAN 2b are connected via a dedicated line tab including a router 60ab in a manner capable of communicating therebetween and built in a predetermined area A. For example, the area A is Japan, and the LAN 2a is built in an office in Tokyo and the LAN 2b is built in an office in Osaka.

In the meantime, the transmission terminals (10ca, 10cb), the MFP 80, the relay device 40c and the router 60c are connected via a LAN 2c in a manner capable of communicating with one another. The transmission terminals (10da, 10db), the relay device 40d and the router 60d are connected via a LAN 2d in a manner capable of communicating with one another. The LAN 2c and the LAN 2d are connected via a dedicated line 2cd including a router 60cd in a manner capable of communicating therebetween and built in a predetermined area B. For example, the area B is the United State, and the LAN 2c is built in an office in New York and the LAN 2d is built in an office in Washington D.C. The area A and the area B are connected in a manner capable of communicating therebetween via the Internet 2i through the routers (60ab, 60cd), respectively.

The MFP 80 belongs to the area B as illustrated in FIG. 1, but may be configured to belong to the area A.

The data managing device 90, the transmission management system 50 and the program providing system 70 are connected in a manner capable of communicating with the transmission terminals 10 and the relay devices 40 via the Internet 2i.

In the embodiment, the LAN 2a, the LAN 2b, the dedicated line 2ab, the Internet 2i, the dedicated line 2cd, the LAN 2c and the LAN 2d constitute a communication network 2 of the embodiment. The communication network 2 may include part where communication is made wirelessly as well as part where wire communication is used.

Next, hardware configurations of the transmission terminals 10, the information providing devices 30, and the MFP 80 described above will be described. First, a hardware configuration of the transmission terminals 10 will be described with reference to FIG. 2.

Figure 2:
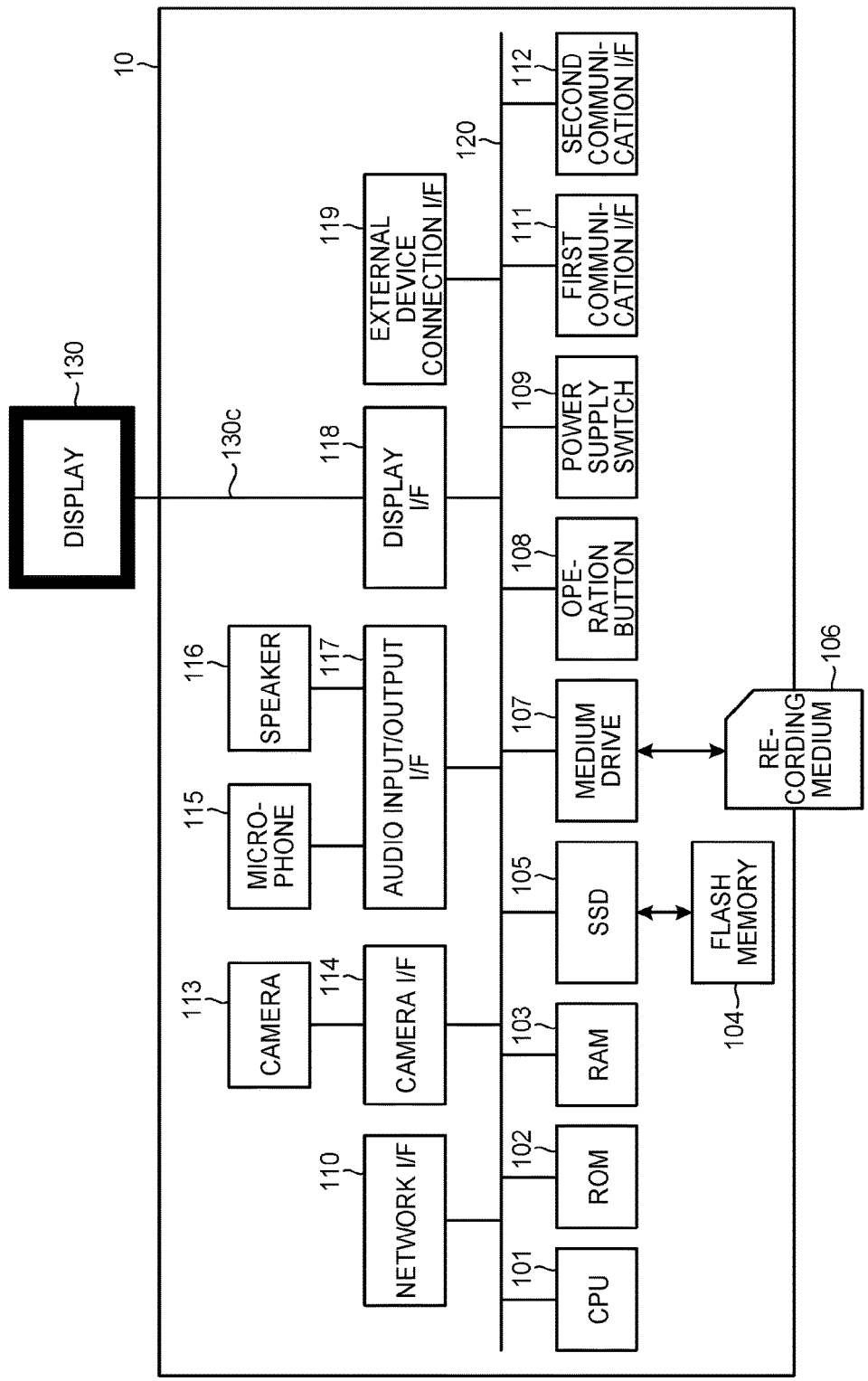
FIG. 2 is a diagram illustrating an example of a hardware configuration of a transmission terminal.

FIG. 2 is a diagram illustrating an example of a hardware configuration of the transmission terminals 10. As illustrated in FIG. 2, a transmission terminal 10 includes a central processing unit (CPU) 101 that controls the entire operation of the transmission terminal 10, a read only memory (ROM) 102 having various programs stored therein, a random access memory (RAM) 103 used as a work area for the CPU 101, a solid state drive (SSD) 105 that reads or writes various data from/into a flash memory 104 according to the control of the CPU 101, a medium drive 107 that controls read or write of various data from/into a recording medium 106 such as a memory card, an operation button 108 such as a cursor operated for selecting an address of a transmission terminal 10 or other operation, a power supply switch 109 for switching a power supply of the transmission terminal 10 on/off, and a network interface (I/F) 110 for transmitting data by using the communication network 2.

The transmission terminal 10 also includes a first communication I/F 111 and a second communication I/F 112 as communication interfaces for transmitting/receiving various data to/from an information providing device 30. Note that the first communication I/F 111 is a communication interface compliant with a wireless communication standard for contactless IC cards called Near Field Communication (NFC) and the second communication I/F 112 is a communication interface compliant with a Bluetooth (registered trademark) communication standard.

The transmission terminal 10 also includes a camera 113 that takes video of participants or the like of a conference and outputs video data, and a camera I/F 114 that controls driving of the camera 113 and transmits/receives image data taken by the camera 113. The camera 113 has an image pickup device such as a complementary metal oxide semiconductor (CMOS) or a charge coupled device (CCD) image sensor therein for imaging a subject to acquire image data according to the control of the CPU 101. The camera 113 is connected to the camera I/F 114 by a universal serial bus (USB) cable or the like.

The transmission terminal 10 also includes an audio input/output I/F 117 that processes input/output of audio signals between a microphone 115 and a speaker 116 according to the control of the CPU 101. Note that the microphone 115 and the speaker 116 are connected to the audio input/output I/F 117 by a USB cable or the like. Audio to be collected by the microphone 115 is audio, etc., around the present transmission terminal 10 (for example, voice of an operator or the like of the present transmission terminal 10), and audio to be output through the speaker 116 is audio transmitted from other transmission terminals 10 (for example, voice of an operator of another transmission terminal 10).

The transmission terminal 10 also includes a display I/F 118 that transmits image data to the display 130 according to the control of the CPU 101. The display 130 is connected to the display I/F 118 via a cable 130c. The cable 130c may be a cable for analog RGB (VGA) signals, a cable for component video, or a cable for a high-definition multimedia interface (HDMI) or digital video interactive (DVI) signals.

While the display 130 is connected to the display I/F 118 in the embodiment, embodiments are not limited thereto but the display I/F 118 may alternatively be connected to a video output device including a projecting device such as a projector.

The transmission terminal 10 also includes an external device connection I/F 119 for connecting an external device. External devices such as an external camera, an external microphone, and an external speaker can each be connected to the external device connection I/F 119 via a universal serial bus (USB) cable or the like. When an external camera is connected, the external camera is driven in precedence to the built-in camera 113 according to the control of the CPU 101. Similarly, when an external microphone is connected or when an external speaker is connected, the external microphone or the external speaker is driven in precedence to the built-in microphone 115 or the built-in speaker 116 according to the control of the CPU 101.

The transmission terminal 10 further includes a bus line 120 such as an address bus and a data bus for electrically connecting the components described above as illustrated in FIG. 2.

Note that the recording medium 106 is attachable/removable to/from the transmission terminal 10. The memory is not limited to the flash memory 104, and may be any nonvolatile memory from/into which data are read/written according to the control of the CPU 101 such as an electrically erasable and programmable ROM (EEPROM). The display 130 is a display unit made of liquid crystal or organic EL that displays images of subjects, icons for operation, and the like.

The programs for transmission terminals executed at the transmission terminal 10 may be recorded and distributed on a computer readable recording medium such as the recording medium 106 described above in a form of a file that can be installed or executed. The programs for transmission terminals may be stored in the ROM 102 instead of the flash memory 104. Alternatively, the programs may be downloaded from the program providing system 70 via the network I/F 110 and recorded on the flash memory 104 or the recording medium 106.

Figure 3:
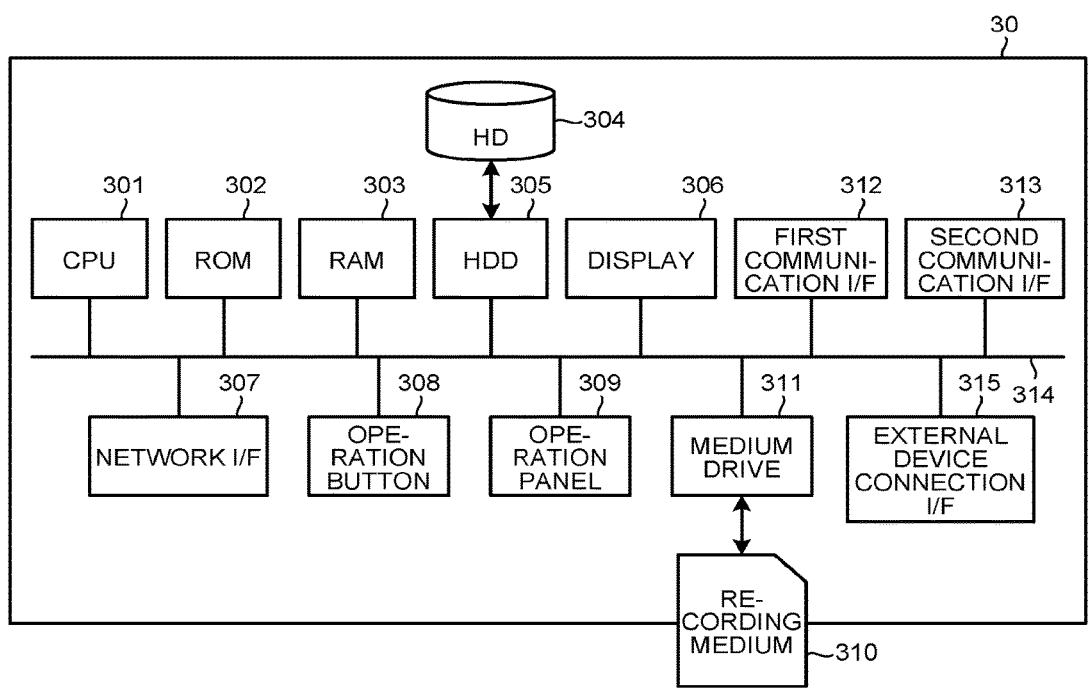
FIG. 3 is a diagram illustrating an example of a hardware configuration of an information providing device.

Next, a hardware configuration of the information providing devices 30 will be described with reference to FIG. 3. FIG. 3 is a diagram illustrating an example of a hardware configuration of the information providing devices 30. As illustrated in FIG. 3, an information providing device 30 includes a CPU 301 that controls the entire operation of the information providing device 30, a ROM 302 having stored therein various programs used for driving the CPU 301, a RAM 303 used as a work area for the CPU 301, a hard disk (HD) 304 that stores various data such as the programs for information providing devices, a hard disk drive (HDD) 305 that controls read/write of various data from/to the HD 304 according to the control of the CPU 301, a display 306 made of a display device such as liquid crystal or organic EL that displays various display information pieces such as a cursor, menus, window, text and images, a network I/F 307 for transmitting data by using the communication network 2, an operation button 308 for selecting and executing various instructions, selecting a subject to be processed, moving a cursor, and the like, an operation panel 309 for selecting and executing various instructions, selecting a subject to be processed, moving a cursor, and the like by using a touch panel, a medium drive 311 that controls read or write of data from/into a recording medium 310 such as a flash memory, and an external device connection I/F 315 for connecting an external device.

The information providing device 30 also includes a first communication I/F 312 and a second communication I/F 313 as communication interfaces for transmitting/receiving various data to/from a transmission terminal 10. Note that the first communication I/F 312 is a communication interface compliant with a wireless communication standard for contactless IC cards called Near Field Communication (NFC) and the second communication I/F 313 is a communication interface compliant with a Bluetooth (registered trademark) communication standard.

Various external devices can be connected to the external device connection I/F 315 by a USB cable or the like. While an example of a configuration in which the information providing device 30 is connected with the transmission terminals 10 through the first communication I/F 312 and the second communication I/F 313 is described in the embodiment, the configuration is not limited thereto. For example, the information providing device 30 may be configured to be connected with the transmission terminals 10 by USB cables or the like through the external device connection I/F 315.

The information providing device 30 further includes a bus line 314 such as an address bus and a data bus for electrically connecting the components described above as illustrated in FIG. 3. Note that the recording medium 310 is attachable/removable to/from the information providing device 30.

The programs for information providing devices executed at the information providing devices 30 may be recorded and distributed on a computer readable recording medium such as the recording medium 310 described above in a form of a file that can be installed or executed. The programs for information providing devices may be stored in the ROM 302 instead of the HD 304. Alternatively, the programs may be downloaded from the program providing system 70 via the network I/F 307 and recorded on a computer readable recording medium such as the HD 304 or the recording medium 310.

The relay devices 40, the transmission management system 50, the program providing system 70 and the data managing device 90 are all server devices and have computer configurations similar to that of the information providing device 30 described above (not illustrated). Each of CPUs included in the relay devices 40, the transmission management system 50, the program providing system 70 and the data managing device 90 implements the functions of each device by executing programs stored in a storage medium included in the present device or programs provided from the program providing system 70. The relay devices 40, the transmission management system 50, the program providing system 70 and the data managing device 90 need not include the first communication I/F 312 and the second communication I/F 313 described above.

Figure 4:
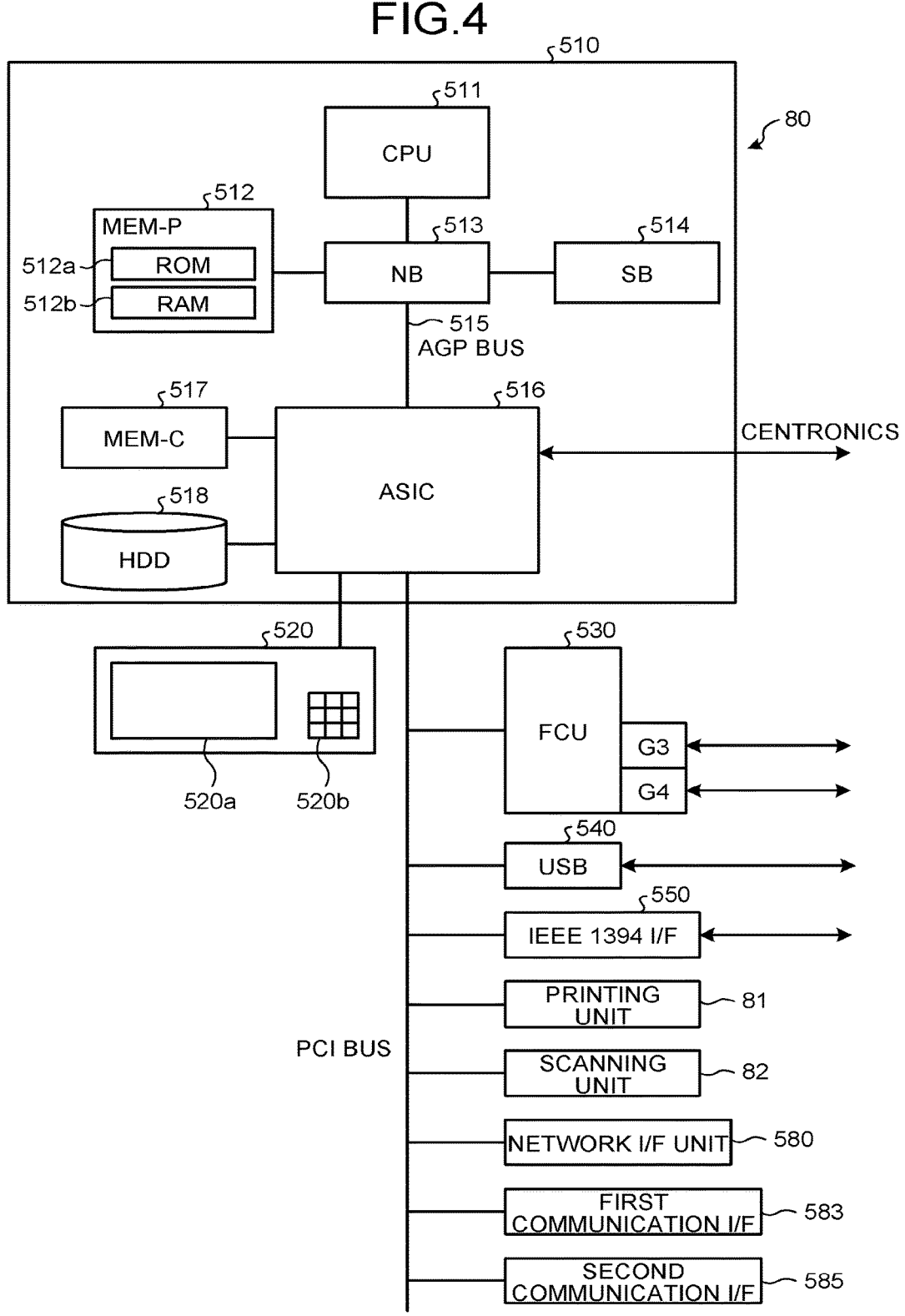
FIG. 4 is a diagram illustrating an example of a hardware configuration of a multifunction peripheral (MFP)

Next, a hardware configuration of the MFP 80 will be described. FIG. 4 is an explanatory diagram illustrating a hardware configuration of the MFP according to the embodiment. As illustrated in FIG. 4, the MFP 80 has a configuration in which a controller 510, a scanning unit 82 and a printing unit 81 that are connected via a peripheral component interconnect (PCI) bus. The controller 510 is a controller that controls control and rendering of the entire MFP 80, communication, and input from an operating unit 520. The scanning unit 82 or the printing unit 81 includes a data processing section that performs error diffusion for binarization, gamma conversion for correcting gradation, and the like. The operating unit 520 has an operation display unit 520a that displays document image information of a document or the like read by the scanning unit 82 on a liquid crystal display (LCD) and receives input made by an operator through a touch panel, and a keyboard unit 520b that receives key inputs made by the operator.

The document box function, the copy function, the printing function, the scanning function and the facsimile function of the MFP 80 according to the embodiment can be selected by switching therebetween by an application switching key of the operating unit 520. A document box mode is entered when the document box function is selected, a copy mode is entered when the copy function is selected, a printer mode is entered when the printing function is selected, a scanner mode is entered when the scanning function is selected, and a facsimile mode is entered when the facsimile function is selected.

The controller 510 has a central processing unit (CPU) 511 that is a main part of a computer, a system memory (MEM-P) 512, a Northbridge (NB) 513, a Southbridge (SB) 514, an application specific integrated circuit (ASIC) 516, a local memory (MEM-C) 517 that is a storage unit, and a hard disk drive (HDD) 518 that is a storage unit, and has a configuration in which the NB 513 and the ASIC 516 are connected by an accelerated graphics port (AGP) bus 515. The MEM-P 512 further has a read only memory (ROM) 512a and a random access memory (RAM) 512b.

The CPU 511 controls the entire digital MFP 80, has a chipset including the NB 513, the MEM-P 512 and the SB 514, and is connected to other devices via the chipset.

The NB 513 is a bridge for connecting the CPU 511 with the MEM-P 512, the SB 514 and the AGP bus 515, and has a memory controller that controls read/write from/to the MEM-P 512 and the like, a PCI master and AGP target.

The MEM-P 512 is a system memory used as a memory for storing programs and data, a memory for expanding programs and data, a memory for rendering for a printer and the like, and includes the ROM 512a and the RAM 512b. The ROM 512a is a read only memory used as a memory for storing programs and data for controlling the operation of the CPU 511, and the RAM 512b is a writable and readable memory used as a memory for expanding programs and data, a memory for rendering for a printer, and the like.

The SB 514 is a bridge for connecting the NB 513 with a PCI device and peripheral devices. The SB 514 is connected to the NB 513 via a PCI bus to which a network interface (I/F) unit 580 and the like are also connected.

The ASIC 516 is an integrated circuit (IC) for image processing application having hardware elements for image processing, and serves as a bridge for connecting each of the AGP bus 515, the PCI bus, the HDD 518 and the MEM-C 517. The ASIC 516 includes a PCI target and AGP master, an arbiter (ARB) that is a core of the ASIC 516, a memory controller that controls the MEM-C 517, a plurality of direct memory access controllers (DMACs) that turns image data or the like by using a hardware logic or the like, and a PCI unit that transfer data between the printing unit 81 and the scanning unit 82 via the PCI bus. The ASIC 516 is connected with a fax control unit (FCU) 530, a universal serial bus (USB) 540, an IEEE 1394 (the Institute of Electrical and Electronics Engineers 1394) interface 550, a first communication I/F 583 and a second communication I/F 585 via the PCI bus. Note that the first communication I/F 583 is a communication interface compliant with the NFC and the second communication I/F 585 is a communication interface compliant with the Bluetooth (registered trademark) communication standard.

The MEM-C 517 is a local memory used as a buffer for images for copy and a code buffer, and the HDD 518 is a storage for accumulating image data, accumulating programs for controlling operation of the CPU 511, accumulating font data and accumulating forms.

The AGP bus 515 is a bus interface for a graphics accelerator card that accelerates the graphics accelerator card by directly accessing the MEM-P 512 at a high throughput.

Figure 5:
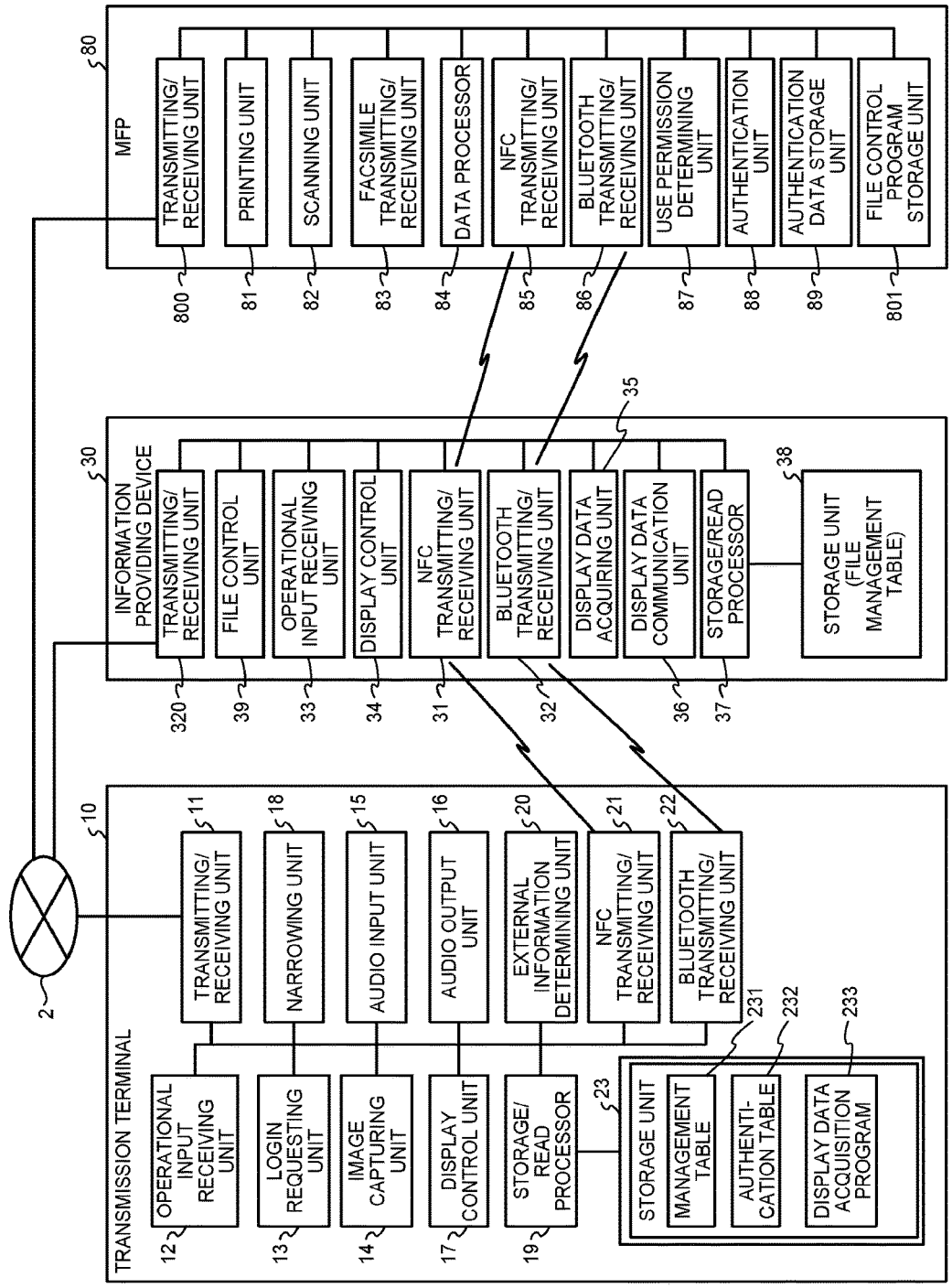
FIG. 5 is a block diagram illustrating functional configurations of the transmission terminal, the information providing device and the MFP.

Next, functional configurations of the transmission terminals 10, the information providing devices 30, and the MFP 80 described above will be described. FIG. 5 is a block diagram illustrating functional configurations of the transmission terminals 10, the information providing devices 30, and the MFP 80.

As illustrated in FIG. 5, a transmission terminal 10 includes a transmitting/receiving unit 11, an operational input receiving unit 12, a login requesting unit 13, an image capturing unit 14, an audio input unit 15, an audio output unit 16, a display control unit 17, a narrowing unit 18, a storage/read processor 19, an external information determining unit 20, an NFC transmitting/receiving unit 21 and a Bluetooth transmitting/receiving unit 22. These units are functions implemented or means caused to function by any of the components illustrated in FIG. 2 operating by instructions from the CPU 101 according to the programs for transmission terminals expanded in the RAM 103. The transmission terminal 10 also includes a storage unit 23 built with the SSD 105 illustrated in FIG. 2.

The transmitting/receiving unit 11 of the transmission terminal 10 is implemented by instructions from the CPU 101 illustrated in FIG. 2 and the network I/F 110 illustrated in FIG. 2, and transmits/receives various data (information) to/from other terminals, devices and systems via the communication network 2. When communication with another transmission terminal 10 that is another participant of a conference is established via a relay device 40, the transmitting/receiving unit 11 also registers the terminal ID of this transmission terminal 10 in a management table 231, which will be described later, stored in the storage unit 23 to manage the terminal IDs of the transmission terminals 10 that the transmission terminal 10 conducts conversation (conference) with. The terminal IDs of the transmission terminals 10 are host names or IP addresses that are assigned in advance to the respective transmission terminals 10, which are identification information pieces that can identify the respective transmission terminals 10.

The operational input receiving unit 12 is implemented by instructions from the CPU 101 illustrated in FIG. 2 and the operation button 108 and the power supply switch 109 illustrated in FIG. 2, and receives various inputs made by the operator of the transmission terminal 10. For example, for selecting a transmission terminal 10 to conduct a conference with, when the operator selects a transmission terminal 10 used by a participant of the conference with a cursor on a screen (not illustrated) for selecting participants of the conference displayed on the display 130 and presses a select button, the operational input receiving unit 12 receives the terminal ID or the IP address of the selected transmission terminal 10 as a participant of the conference. In addition, for changing the arrangement and the size (layout) of image data to be displayed on a screen, the operational input receiving unit 12 receives information instructing the change from the operator of the present transmission terminal 10 via the operation button 108 or the like.

The login requesting unit 13 is implemented by instructions from the CPU 101 illustrated in FIG. 2, and automatically transmits login request information requesting login of the present transmission terminal 10 and the current IP address of the present transmission terminal 10 through the transmitting/receiving unit 11 to the transmission management system 50 via the communication network 2. Note that the login request information is assumed to contain at least the terminal ID, and the transmission management system 50 manages login request information pieces and IP addresses transmitted from each transmission terminals 10. The transmission of the login request information and the IP address to the transmission management system 50 is set to be automatically performed when the transmission terminal 10 is powered on.

The image capturing unit 14 is implemented by instructions from the CPU 101 illustrated in FIG. 2 and the camera 113 and the camera I/F 114 illustrated in FIG. 2, and captures images of a conference room including participants and the like that are subjects, and outputs image data acquired by the capturing.

The audio input unit 15 is implemented by instructions from the CPU 101 illustrated in FIG. 2 and the audio input/output I/F 117 illustrated in FIG. 2, and converts sound in the vicinity of the transmission terminal 10 collected by the microphone 115 into audio signals to generate audio data. The audio output unit 16 is implemented by instructions from the CPU 101 illustrated in FIG. 2 and the audio input/output I/F 117 illustrated in FIG. 2, and outputs audio data and the like transmitted from other transmission terminals 10 to the speaker 116 to output audio through the speaker 116.

The display control unit 17 is implemented by instructions from the CPU 101 illustrated in FIG. 2 and the display I/F 118 illustrated in FIG. 2, transmits image data and display data to the display 130 and performs control to display these data.

The narrowing unit 18 is implemented by instructions from the CPU 101 illustrated in FIG. 2 and the network I/F 110 illustrated in FIG. 2, and performs processing to narrow down a plurality of relay device 40 to one relay device 40. Specifically, the narrowing unit 18 calculates the time (in units of msec) required from transmission of certain transmission information to each relay device 40 until acknowledgement information (ACK) in response to the transmission information is received from the relay device 40, and selects one relay device 40 from a plurality of relay devices 40 by selecting a relay device 40 that performs relay in the shortest of the calculated required times as the relay device 40 to be used.

The storage/read processor 19 is implemented by instructions from the CPU 101 illustrated in FIG. 2 and the SSD 105 illustrated in FIG. 2, and performs processing to store various data in the storage unit 23 and read various data stored in the storage unit 23.

The storage unit 23 has stored therein a management table 231 (see FIG. 6) for managing terminal identifications (IDs) of other transmission terminals 10 to be participants of a conference, and an authentication table 232 (see FIG. 7) in which authentication information (user IDs and passwords) for determining whether or not to permit use of the information providing devices 30 is stored. The storage unit 23 also has stored therein a display data acquisition program 233 to be executed by the CPU 301 of an information providing device 30 when the present storage unit 23 is mounted on the information providing device 30, a driver for data transmission and the like. The display data acquisition program 233 is a program for implementing a display data acquiring unit 35 in the information providing device 30.

FIG. 6 is a diagram illustrating an example of the management table 231 stored in the storage unit 23. As illustrated in FIG. 6, terminal IDs of the transmission terminals 10 to be participants of a conference are registered in association with data numbers in the management table 231. In a column for storing terminal IDs, terminal IDs of the transmission terminals 10 of participants of a conference (transmission terminal 10*aa*, transmission terminal 10*ba*, transmission terminal 10*ca*) are registered. The data numbers are management numbers for managing the respective terminal IDs and used for assigning image data (captured image data) distributed from the transmission terminals 10 having the respective terminal IDs to display regions, which will be described later.

FIG. 7 is a diagram illustrating an example of the authentication table 232 stored in the storage unit 23. As illustrated in FIG. 7, the authentication table 232 includes a column (user ID column) in which user IDs are stored and a column (password column) in which passwords are stored, and has stored therein user IDs and passwords of authorized users of the information providing devices 30 in association with each other. It is assumed that authentication information including sets of user IDs and passwords are distributed in advance to authorized users of the information providing devices 30.

Referring back to FIG. 5, the external information determining unit 20 is implemented by the CPU 101 illustrated in FIG. 2, and determines whether or not data are transmitted/received from an information providing device 30 external to the transmission terminal 10.

The NFC transmitting/receiving unit 21 is implemented by instructions from the CPU 101 illustrated in FIG. 2 and the first communication I/F 111 illustrated in FIG. 2, and performs contactless communication (hereinafter referred to as NFC communication) with an NFC transmitting/receiving unit 31, which will be described later, of an information providing device 30 through contactless communication according to the NFC standard.

Note that the NFC transmitting/receiving unit 21 transmits/receives data through contactless wireless communication at a communication distance shorter than that of the second communication I/F 112 (Bluetooth transmitting/receiving unit 22) that is another communication unit, more specifically, at a communication distance of about 10 cm at maximum. Since the data transfer rate (424 kbps at maximum) of contactless communication according to the NFC standard performed by the NFC transmitting/receiving unit 21 is lower than that (24 Mbps at maximum) of wireless communication according to the Bluetooth (registered trademark) communication standard performed by the Bluetooth transmitting/receiving unit 22, the contactless communication according to the NFC standard is assumed to be used for transmission of relatively small data. Note that the communication standard for the NFC transmitting/receiving unit 21 need not be limited to the NFC, but a functional unit according to another communication standard may be realized by using a communication interface according to the communication standard as the first communication I/F 111 as long as wireless communication at a relatively shorter distance, that is, in a communication range smaller than that of wireless communication according to the Bluetooth (registered trademark) communication standard, which will be described later, is possible.

When an information providing device 30 approaches the communication range of the NFC transmitting/receiving unit 21, the NFC transmitting/receiving unit 21 performs NFC communication with the NFC transmitting/receiving unit 31, which will be described later, of the information providing device 30, receives authentication information transmitted from the NFC transmitting/receiving unit 31 and transmits connection setting information necessary for establishing wireless communication according to the Bluetooth (registered trademark) communication standard (hereinafter referred to as Bluetooth communication) to the NFC transmitting/receiving unit 31. Note that the connection setting information is information necessary for performing wireless communication by the Bluetooth transmitting/receiving unit 22 and contains a Bluetooth device (BD) address, a passphrase and the like assigned to the second communication I/F 112. The connection setting information may be in a form held by the NFC transmitting/receiving unit 21 or may be in a form read by the NFC transmitting/receiving unit 21 from the second communication I/F 112.

The Bluetooth transmitting/receiving unit 22 is implemented by instructions from the CPU 101 illustrated in FIG. 2 and the second communication I/F 112 illustrated in FIG. 2, and communicates wirelessly with the information providing devices 30 according to the Bluetooth (registered trademark) communication standard that is a short-range communication unit. The Bluetooth transmitting/receiving unit 22 transmits/receives larger data (24 Mbps at maximum) than the NFC transmitting/receiving unit 21 employing a contactless communication scheme according to the NFC standard. The Bluetooth transmitting/receiving unit 22 can be used at a distance between devices of about 10 to 100 m, which is larger in communication range than the NFC transmitting/receiving unit 21.

For transmitting/receiving data to/from an information providing device 30, the Bluetooth transmitting/receiving unit 22 establishes Bluetooth communication with the information providing device 30 by using the connection setting information that the NFC transmitting/receiving unit 21 transmitted to the information providing device 30.

While the communication I/F compliant with the Bluetooth (registered trademark) communication standard is used as the second communication I/F 112 in the embodiment, the communication I/F is not limited thereto and a communication I/F in wireless fidelity (WiFi) according to another standard such as the IEEE802.11a/IEEE802.11B standard may be used. In this case, a WiFi transmitting/receiving unit that corresponds to the Bluetooth transmitting/receiving unit 22 may be constituted by a network board according to the IEEE802.11a/b/g/n for transmitting/receiving data and a communication control unit (communication control programs) for controlling establishment of wireless communication according to IEEE802.11a/b/g/n and transmission/reception of data.

Alternatively, a configuration in which wireless communication is performed according to a wireless USB standard capable of communication at 480 Mbps equivalent to that of a wired USB 2.0 can be used when the distance between devices is 3 m or shorter in the ultra wide band (UWB) communication scheme. In this case, a wireless USB transmitting/receiving unit that corresponds to the Bluetooth transmitting/receiving unit 22 may be constituted by a USB device according to the wireless USB standard for transmitting/receiving data and a communication control unit (a communication control programs) for controlling establishment of wireless communication according to the UWB communication scheme and transmission/reception of data.

Next, the information providing devices 30 will be described. As illustrated in FIG. 5, an information providing device 30 includes a transmitting/receiving unit 320, the NFC transmitting/receiving unit 31, a Bluetooth transmitting/receiving unit 32, an operational input receiving unit 33, a display control unit 34, a display data acquiring unit 35, a display data communication unit 36, a storage/read processor 37, and a file control unit 39. These units are functions implemented or means caused to function by any of the components illustrated in FIG. 3 operating by instructions from the CPU 301 according to the programs for information providing devices expanded in the RAM 303. The information providing device 30 also includes a storage unit 38 that is built by the HDD 305 illustrated in FIG. 3.

The transmitting/receiving unit 320 is implemented by instructions from the CPU 301 illustrated in FIG. 3 and the network I/F 307 illustrated in FIG. 3, and transmits/receives various data to/from other terminals, devices or systems via the communication network 2. The transmitting/receiving unit 320 receives data from the data managing device 90, for example.

The NFC transmitting/receiving unit 31 is implemented by instructions from the CPU 301 illustrated in FIG. 3 and the first communication I/F 312 illustrated in FIG. 3, and communicates contactlessly with the NFC transmitting/receiving units 21 of the transmission terminals 10 and an NFC transmitting/receiving unit 85 of the MFP 80 through contactless communication according to the NFC standard.

In addition, when the present information providing device 30 approaches the communication range of the NFC transmitting/receiving unit 21 of a transmission terminal 10, the NFC transmitting/receiving unit 31 establishes NFC communication with the NFC transmitting/receiving unit 21 of the transmission terminal 10 and transmits/receives various data (information). Specifically, when the NFC communication is established with the NFC transmitting/receiving unit 21 of the transmission terminal 10, the NFC transmitting/receiving unit 31 transmits authentication information input by a user of the present device to the transmission terminal 10 and receives connection setting information held by the NFC transmitting/receiving unit 21 of the transmission terminal 10. In the embodiment, the authentication information input to an information providing device 30 by a user of the information providing device 30 is returned to the transmission terminal 10 to communicate with so as to cause the transmission terminal 10 to authenticate the authentication information.

Similarly, when the present information providing device 30 approaches the communication range of the NFC transmitting/receiving unit 85 of the MFP 80, the NFC transmitting/receiving unit 31 establishes NFC communication with the NFC transmitting/receiving unit 85 of the MFP 80 and transmits/receives various data (information). Specifically, when the NFC communication with the NFC transmitting/receiving unit 85 of the MFP 80 is established, the NFC transmitting/receiving unit 31 transmits an authentication ID and a function ID for using the MFP 80 from the information providing device 30, communication setting information and for establishing communication through the Bluetooth transmitting/receiving unit 32, and function setting information.

The Bluetooth transmitting/receiving unit 32 is implemented by instructions from the CPU 301 illustrated in FIG. 3 and the second communication I/F 313 illustrated in FIG. 3, and transmits display data acquired by the display data acquiring unit 35, which will be described later, to a transmission terminal 10 when communication with the Bluetooth transmitting/receiving unit 22 of the transmission terminal 10 is established. The Bluetooth transmitting/receiving unit 32 also receives information indicating a shared state of display data and the like from a transmission terminal 10. Furthermore, when communication with the Bluetooth transmitting/receiving unit 86 of the MFP 80 is established, the Bluetooth transmitting/receiving unit 32 receives image data from the MFP 80.

Figure 8:
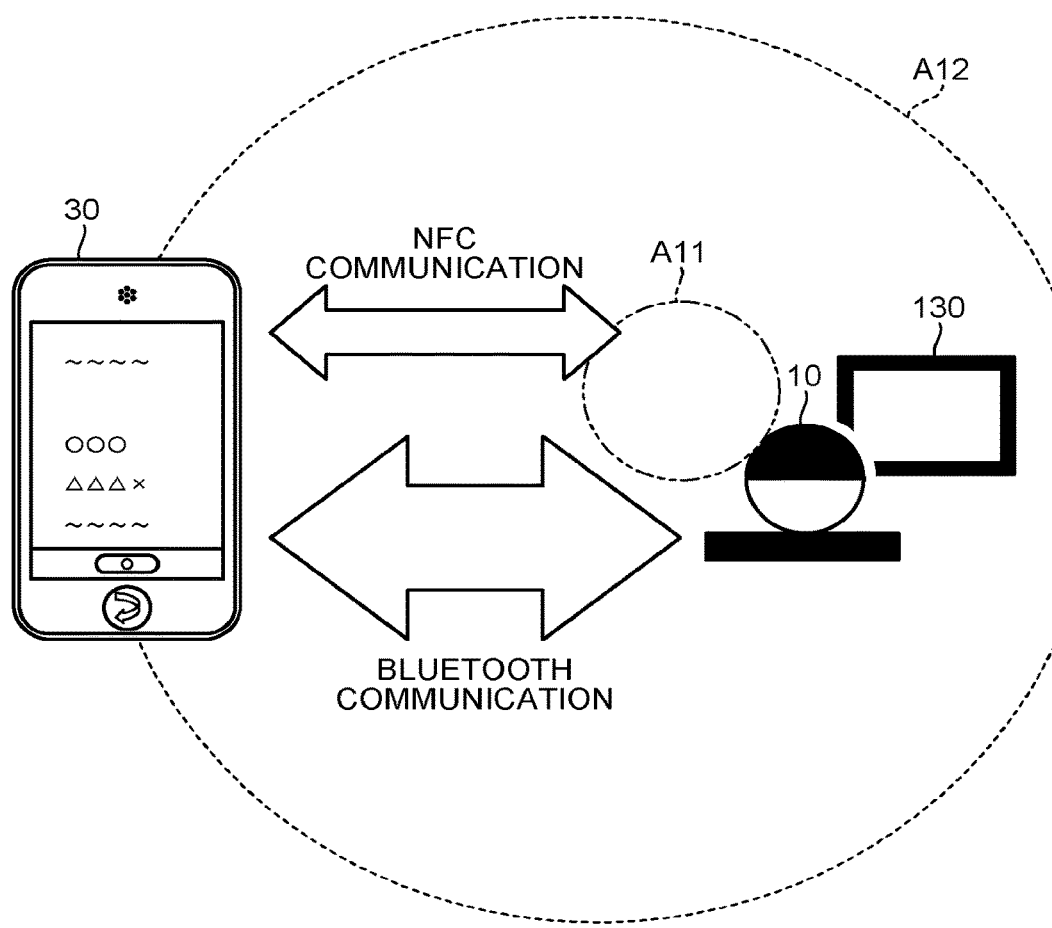
FIG. 8 is a diagram for explaining communication ranges of wireless communication connecting the transmission terminal and the information providing device.
Figure 9:
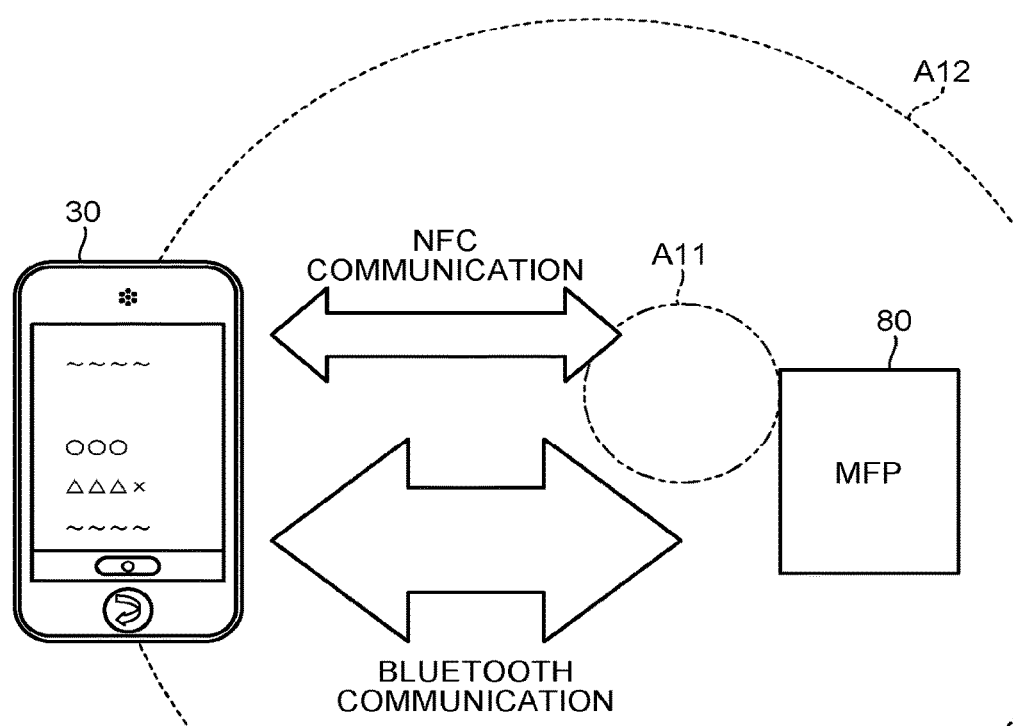
FIG. 9 is a diagram for explaining communication ranges of wireless communication connecting the MFP and the information providing device.

FIG. 8 is a diagram for explaining the communication ranges of wireless communication connecting a transmission terminal 10 and an information providing device 30. FIG. 9 is a diagram for explaining the communication ranges of wireless communication connecting the MFP 80 and an information providing device 30.

In FIGS. 8 and 9, a communication range A11 indicated by a chain double dashed line represents a communication range according to the NFC standard, that is, a near field communication range in which communication between the NFC transmitting/receiving unit 21 and the NFC transmitting/receiving unit 31 and between the NFC transmitting/receiving unit 85 and the NFC transmitting/receiving unit 31 is possible. In addition, a communication range Alt indicated by a broken line represents a communication range according to the Bluetooth (registered trademark) communication standard, that is, a near field communication range in which communication between the Bluetooth transmitting/receiving unit 22 and the Bluetooth transmitting/receiving unit 32 and between the Bluetooth transmitting/receiving unit 86 and the Bluetooth transmitting/receiving unit 32 is possible. In this manner, the communication range A12 has a larger range in which communication is possible allowing communication at a longer distance than the communication range A11.

As described above, upon entering the communication range A11, the NFC transmitting/receiving unit 21 and the NFC transmitting/receiving unit 31, and the NFC transmitting/receiving unit 85 and the NFC transmitting/receiving unit 31 automatically establish NFC communication and transfer authentication information and connection setting information. Thereafter, when the authentication information is accepted by the transmission terminal 10 and the MFP 80, the Bluetooth transmitting/receiving unit 22 and the Bluetooth transmitting/receiving unit 32, and the Bluetooth transmitting/receiving unit 86 and the Bluetooth transmitting/receiving unit 32 establish Bluetooth communication by using the connection setting information that has been exchanged.

In this manner, the connection setting information necessary for Bluetooth communication between the transmission terminal 10 and the information providing device 30 and between the MFP 80 and the information providing device 30 is exchanged through the NFC communication allowing easy transmission/reception of data. In addition, the user of an information providing device 30 can transfer information necessary for establishing Bluetooth communication with a transmission terminal 10 or the MFP 80 only by bringing the information providing device 30 close to the transmission terminal 10 of the MFP 80. In this manner, the transmission terminal 10 or the MFP 80 to communicate with can be identified and the Bluetooth communication is enabled without any special operation, which can increase the convenience.

Referring back to FIG. 5, the operational input receiving unit 33 is implemented by instructions from the CPU 301 illustrated in FIG. 3 and the operation button 308 and the operation panel 309 illustrated in FIG. 3, and receives input made by operation of a user.

The display control unit 34 is implemented by instructions from the CPU 301 illustrated in FIG. 3 and the display 306 illustrated in FIG. 3, and displays various information such as a cursor, menus, windows, text or images on the display 306.

The display data acquiring unit 35 is implemented by cooperation of the CPU 301 illustrated in FIG. 3 and the display data acquisition program 233 stored in the storage unit 23 of a transmission terminal 10, and acquires display data on various information to be displayed on the display 306 by the display control unit 34.

The display data communication unit 36 is implemented by instructions from the CPU 301 illustrated in FIG. 3 and the second communication I/F 313 illustrated in FIG. 3, and transmits display data acquired by the display data acquiring unit 35 to a transmission terminal 10 via the Bluetooth transmitting/receiving unit 32. The display data communication unit 36 also receives various information transmitted from a transmission terminal 10 according to a change in the state thereof.

The storage/read processor 37 is implemented by instructions from the CPU 301 illustrated in FIG. 3 and the HDD 305 illustrated in FIG. 3, and performs processing for storing various data in the storage unit 38 and reading various data stored in the storage unit 38. The storage unit 38 has stored therein in advance data (hereinafter referred to as material data) such as materials to be shared in a conference, various programs (word processor, spreadsheet, presentation) for displaying the material data, and the like. The material data include data scanned by the MFP 80 and received.

The file control unit 39 functions as a control unit, and generates a file management table in which storage location information for one or more pieces of data received from the MFP 80 is associated with a file name that is identification information of the data in the storage unit 38. In the file management table, each of file names of one or more pieces of data is associated with storage location information.

FIG. 10 is an explanatory diagram illustrating an example of the file management table. In the present embodiment, storage location information and a file name are described using one path, which associates the storage location of data and the file name. The storage location information is information containing a device in which data are stored and a storage location of data in the device. In the embodiment, it is assumed that data are stored in the data managing device 90. In an example of "https://dataserver.xxx.co.jp/conference/doc/strategy.pdf" in FIG. 10, "https://dataserver.xxx.co.jp" is an URL of the data managing device 90 that is the device in which data are stored. "/conference/doc" represents storage location in the storage unit of the data managing device 90, and "strategy.pdf" represents the file name of the data. Thus, since the storage location information of data contains the device in which the data are stored and information representing the path to access to the data in the device, the information providing device 30 can identify the storage location of the file by referring to the file management table.

Referring back to FIG. 5, the display control unit 34 described above displays a list of data files of one or more pieces of data registered in the file management table on the display 306 to allow a user to select a file name of data to be shared through the operational input receiving unit 33. The transmitting/receiving unit 320 receives the data of the selected file name from the storage location in the data managing device 90 indicated by the storage location information via the Internet 2*i*. The display control unit 34 displays the received data. The display data communication unit 36 also transmits the received data to a transmission terminal 10 via the Bluetooth transmitting/receiving unit 32.

Next, a functional configuration of the MFP 80 will be described. The MFP 80 includes a transmitting/receiving unit 800, the scanning unit 82, the printing unit 81, a facsimile transmitting/receiving unit 83, a data processor 84, the NFC transmitting/receiving unit 85, the Bluetooth transmitting/receiving unit 86, a use permission determining unit 87, an authentication unit 88, an authentication data storage unit 89, and a file control program storage unit 801.

The transmitting/receiving unit 800 is implemented by instructions from the CPU 511 and the network I/F unit 580, and transmits/receives various data to/from other terminals, devices or systems via the communication network 2. The transmitting/receiving unit 800 transmits/receives various data to/from the data managing device 90 and the information providing devices 30, for example.

The NFC transmitting/receiving unit 85 performs contactless and bidirectional communication with an information providing device 30 according to the NFC wireless communication standard described above, and more specifically, has a function of a reader/writer or a tag having therein communication control programs for contactlessly reading information from the NFC transmitting/receiving unit 31 of an information providing device 30. The NFC transmitting/receiving unit 85 transmits/receives data through contactless wireless communication at a communication distance shorter than that of the Bluetooth transmitting/receiving unit 86 that is another communication unit, more specifically, at a communication distance of about 0 to more than 10 cm. Since the data transfer rate (100 to 400 kbps) of contactless communication according to the NFC standard performed by the NFC transmitting/receiving unit 85 is lower than that (1 to 2 Mbps) of wireless communication according to the Bluetooth® communication standard performed by the Bluetooth transmitting/receiving unit 86, the contactless communication according to the NFC standard is used for transmission of relatively small data. Note that the communication standard for the NFC transmitting/receiving unit 85 need not be limited to the NFC, but may be another communication standard such as the Infrared Data Association (IrDA) as long as wireless communication at a relatively shorter distance, that is, in a communication range smaller than that of wireless communication according to the Bluetooth® communication standard, which will be described later, is possible.

When an information providing device 30 is present in the communication range of the NFC transmitting/receiving unit 85, the NFC transmitting/receiving unit 85 establishes communication with the NFC transmitting/receiving unit 31 of the information providing device 30 by using the same communication protocol as the communication control programs for the NFC transmitting/receiving unit 31 of the information providing device 30 and receives an authentication ID, a function ID, communication setting information and function setting information transmitted from the information providing device 30. Note that the authentication ID is authentication information for determining whether or not to permit use of the MFP 80 instructed by the information providing device 30. The authentication ID may be unique information assigned to the information providing device 30 or information for identifying a user that owns the information providing device 30. When information for identifying a user is used, information such as an employee ID may be used. The function ID is function information representing a function of the MFP 80 requested to be used by the information providing device 30, and when the printing function of the MFP 80 is to be used, for example, the function ID is set to a printing ID. When the scanning function of the MFP 80 is to be used, the function ID is set to a "scanning ID".

The communication setting information is initial setting information necessary for performing wireless communication through the Bluetooth transmitting/receiving unit 86. In this manner, as a result of receiving the communication setting information for the Bluetooth communication between the information providing device 30 and the MFP 80 through the NFC communication allowing easy transmission/reception of data, the user only needs to bring the information providing device 30 close to the MFP 80 without any special operation to identify the MFP 80 to communicate with and enable the Bluetooth communication, which increases the convenience. The function setting information is setting information instructing processing according to the function. For example, when a printing ID is set as the function ID, a setting ID "duplex printing" that is printing setting information is set to a set value "on" or "off" and a setting ID "layout" that is printing setting information is set to a set value "on" or "off" as the function setting information. When the scanning ID is set as the function ID, a setting ID "resolution" that is scanning setting information is set to a set value "300" dpi, etc., as the function setting information.

The authentication unit 88 determines whether or not an authentication ID transmitted by an information providing device 30 is an ID for which use of the MFP 80 can be permitted. Specifically, authentication is made by determining whether or not the authentication ID received by the NFC transmitting/receiving unit 85 and the authentication ID stored in the authentication data storage unit 89 are identical.

The use permission determining unit 87 determines whether or not a function ID transmitted by an information providing device 30 is an ID for which use of the MFP 80 can be permitted. Specifically, the determination is made by acquiring use permission information associated with the authentication ID and the function ID received by the NFC transmitting/receiving unit 85 from the authentication data storage unit 89 and determining whether or not use permission is set in the acquired use permission information.

The Bluetooth transmitting/receiving unit 86 communicates contactlessly with an information providing device 30 according to the Bluetooth® standard. The Bluetooth transmitting/receiving unit 86 employing the wireless communication scheme according to the Bluetooth® scheme transmits/receives larger data at higher rate (1 to 10 Mbps) than the NFC transmitting/receiving unit 85 employing the contactless communication scheme according to the NFC standard. The Bluetooth transmitting/receiving unit 86 employing the wireless communication scheme according to the Bluetooth® standard can be used even if there is an obstacle as long as the distance between devices is 10 m or shorter, and has a larger communication range than the communication scheme according to the NFC standard.

Specifically, the Bluetooth transmitting/receiving unit 86 is constituted by a Bluetooth® interface (I/F) such as a transceiver according to the Bluetooth® for transmitting/receiving data and a communication control unit. The Bluetooth® I/F performs transmission/reception of data with an information providing device 30 to which the MFP 80 is connected. The communication control unit is a communication control program for performing processing of exchanging communication setting information with an information providing device 30 to communicated with via the Bluetooth® I/F before transmitting/receiving data to/from the information providing device 30 and establishing wireless communication according to the Bluetooth® standard. Unique address information assigned to the Bluetooth® I/F is used as the communication setting information.

While the Bluetooth transmitting/receiving unit 86 compliant with the Bluetooth® is used for wireless communication in the embodiment, the configuration is not limited thereto but wireless communication may be performed in a scheme according to another standard such as a so-called wireless LAN standard such as IEEE802.11a/IEEE802.11b/IEEE802.11n/IEEE802.11g instead of the Bluetooth® standard. In this case, a wireless LAN communication unit may be constituted by a network board according to the IEEE802.11a/IEEE802.11b standard for transmitting/receiving data and a communication control unit (communication control programs) for controlling establishment of wireless communication according to IEEE802.11a/IEEE802.11b and transmission/reception of data. Alternatively, a configuration in which wireless communication is performed according to a wireless USB standard capable of communication at 480 Mbps equivalent to that of a wired USB 2.0 can be used when the distance between devices is 3 m or shorter in the UWB communication scheme. In this case, a wireless USB communication unit may be constituted by a UWB device according to the wireless USB standard for transmitting/receiving data and a communication control unit (communication control programs) for controlling establishment of wireless communication and transmission/reception of data.

The Bluetooth transmitting/receiving unit 86 also receives communication setting information from an information providing device 30 through the NFC communication, and when Bluetooth communication with the information providing device 30 is established according to the received communication setting information, the Bluetooth transmitting/receiving unit 86 transmits/receives data according to the function ID. Transmitted/received data may be image data, document data, text data, and any other various types of data.

The scanning unit 82 reads a document by an image pickup device such as a charge coupled device (CCD). The scanning unit 82 may be provided with a function of automatic document feeding by having an automatic document feeder (ADF) mounted thereon.

The data processor 84 processes data received by the Bluetooth transmitting/receiving unit 86 or data to be transmitted by the Bluetooth transmitting/receiving unit 86 according to a function ID received by the NFC transmitting/receiving unit 85 and function setting conditions. For example, when the function ID is the "printing ID", image processing such as density and color adjustment, layout processing such as simplex/duplex printing, and the like are performed on data according to the function setting information. For another example, when the function ID is the "scanning ID", image processing, layout processing and the like are performed on data read from the scanning unit 82 according to the function setting conditions.

The printing unit 81 prints data on which image processing, layout processing and the like are performed by the data processor 84.

The facsimile transmitting/receiving unit 83 transmits data read by the scanning unit 82 and data transmitted from the information providing device 30 to another MFP, a facsimile device, a client terminal or the like via a network. The facsimile transmitting/receiving unit 83 also receives data transmitted from another MFP, a facsimile device or a client terminal.

The authentication data storage unit 89 stores authentication data for determining whether or not a function of the MFP 80 can be used. FIG. 11 is an explanatory diagram illustrating an example of a data structure in the authentication data storage unit 89. The authentication data storage unit 89 stores an authentication ID in association with use permission information for each function ID. As illustrated in FIG. 11, an authentication ID "person 1" is permitted to use both the printing function and the scanning function of the MFP 80. An authentication ID "person 2" is permitted to use the scanning function of the MFP 80 but is not permitted to use the printing function thereof.

The file control program storage unit 801 stores file control programs. The file control programs are programs used by an information providing device 30 to control data generated by the MFP 80. The file control programs are programs transmitted to an information providing device 30 via the communication network 2 and executed by the information providing device 30.

Figure 12:
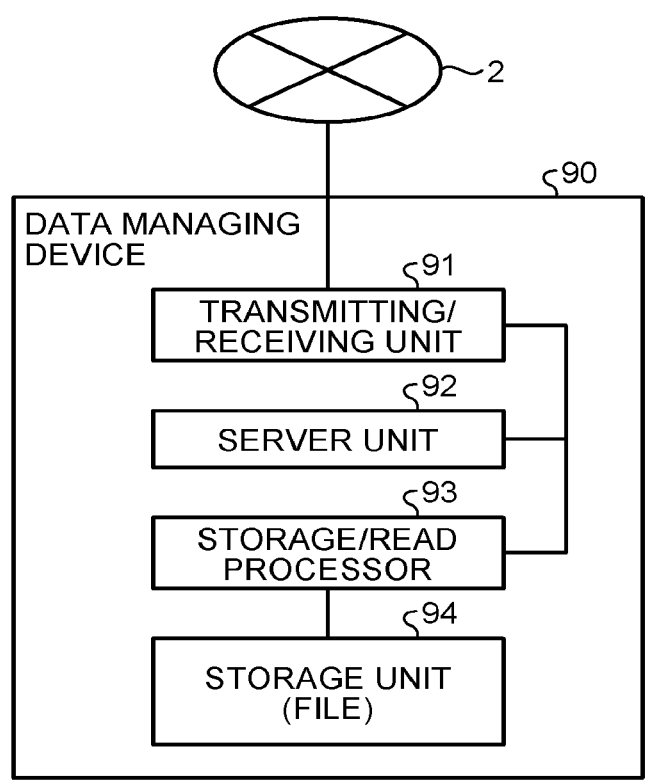
FIG. 12 is a block diagram illustrating a functional configuration of a data managing device.

FIG. 12 is a block diagram illustrating a functional configuration of the data managing device 90. As illustrated in FIG. 12, the data managing device 90 includes a transmitting/receiving unit 91, a server unit 92, a storage/read processor 93 and a storage unit 94.

The transmitting/receiving unit 91 is implemented by instructions from the CPU 301 and the network I/F 307, and transmits/receives various data to/from other terminals, devices or systems via the communication network 2. The transmitting/receiving unit 91 transmits/receives various data to/from the MFP 80 and the information providing devices 30, for example.

The server unit 92 is implemented by the CPU 301, and performs functions as a server such as a general http server. For example, when an URL is received by another device, the server unit 92 analyzes the URL and instructs the storage/read processor 93 to write or read various data according to the analysis result.

The storage/read processor 93 is implemented by instructions from the CPU 301 and the HDD 305. The storage/read processor 93 writes various data in the storage unit 94, for example, and read various data from the storage unit 94, for example.

The storage unit 94 is implemented by the HD 304 and stores various data. The storage unit 94 save data received from the MFP 80 in association with a data ID for identifying data, for example.

Next, data to be displayed on the display 130 of a transmission terminal 10 of the transmission system 1 described above will be described. Examples of data to be displayed on the display 130 of the transmission terminals 10 at a remote conference include captured image data captured by the camera 113 and display data transmitted from an information providing device 30 (including data scanned by the MFP 80 and saved in the information providing device 30). The captured image data refer to image data captured by the cameras 113 of the present and other transmission terminals 10. The display data present a screen displayed on a display 306 of an information providing device 30.

Figure 13:
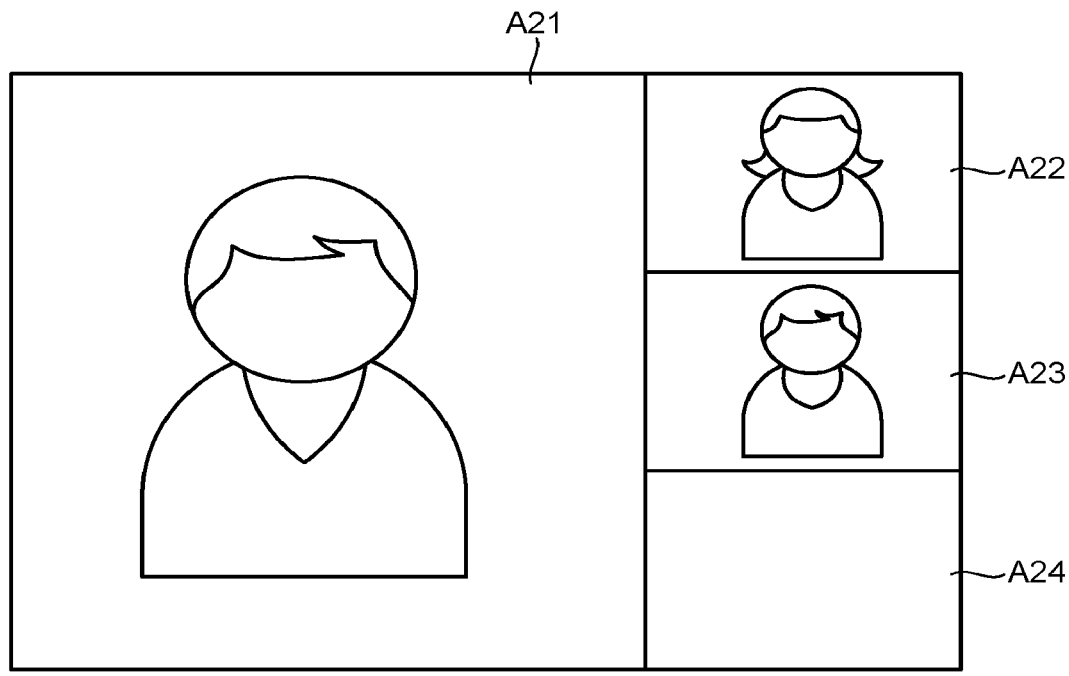
FIG. 13 is a diagram illustrating an example of a display screen displayed on a display of the transmission terminal.

FIG. 13 is a diagram illustrating an example of a display screen displayed on the display 130 of a transmission terminal 10. FIG. 13 illustrates an example in which one screen is divided into four regions, in which a large region (first display region) from the left to the center of the screen is referred to as a display region A21 and small regions (second display regions) from the upper-right to the lower-right of the screen are referred to as display regions A22 to A24, respectively. In the case of the screen configuration of FIG. 13, captured image data of the transmission terminal 10 with the microphone 115 to which a participant of the conference is speaking is assigned to the display region A21, for example. Processing therefor will be described below.

First, the CPU 101 of each transmission terminal 10 detects a period of speech made by an operator of the present transmission terminal 10 input via the audio input unit 15, and when the period is detected, the CPU 101 transmits the terminal ID of the present transmission terminal 10 to the other transmission terminals 10 via a relay device 40. When the transmission terminals 10 receive the terminal ID, the display control unit 17 of each of the transmission terminals 10 refers to the management table 231 illustrated in FIG. 6 and identifies the data number associated with the terminal ID. The display control unit 17 then assigns and displays the captured image data received from the transmission terminal 10 with the terminal ID associated with the identified data number to/on the display region A21. Furthermore, the display control unit 17 assigns and displays captured image data received from other transmission terminals 10 with terminal IDs associated with other data numbers to/on display regions sequentially from the display region A22. As a result, the captured image data of the transmission terminal 10 currently providing speech are arranged at a position closer to the center of the display screen and displayed in a larger size than other image data, which can increase the visibility of the participant who is currently speaking and display the participant in an enhanced manner. The order of display regions A22 to A24 to which the data numbers are assigned is not particularly limited, and the data numbers may be sorted in ascending order or in descending order, for example.

Figure 14:
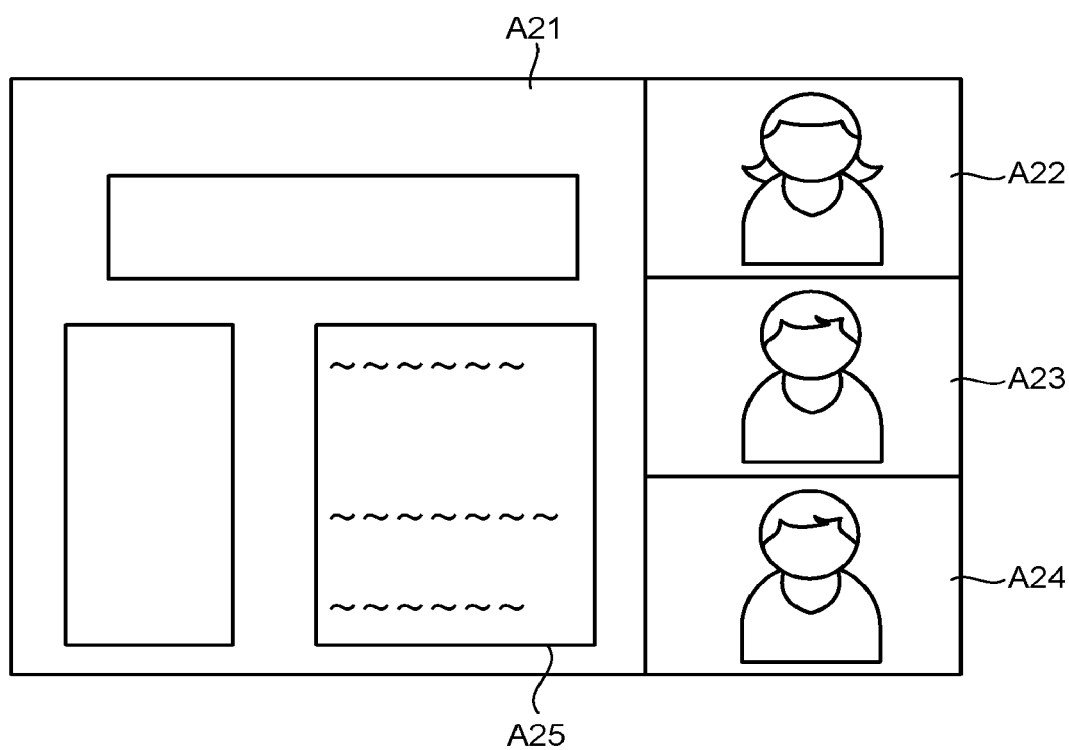
FIG. 14 is a diagram illustrating an example of a display screen displayed on the display of the transmission terminal.

When display data are transmitted from an information providing device 30, the display control unit 17 assigns the display data to the display region A21 and displays the display data as in a display region A25, and also assigns and displays captured image data from the respective transmission terminals 10 to/on display regions sequentially from the display region A22 as illustrated in FIG. 14. As a result, the display data are arranged at a position closer to the center of the display screen and displayed in a larger size than other image data, which can increase the visibility of presentation materials or the like and display the presentation materials or the like in an enhanced manner.

Figure 15:
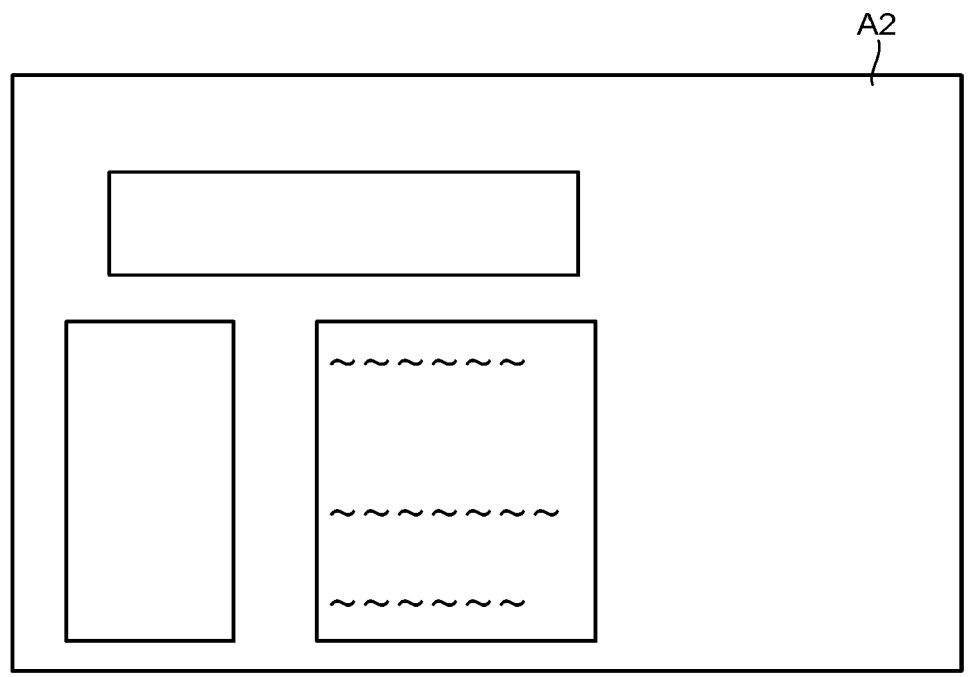
FIG. 15 is a diagram illustrating an example of a display screen displayed on the display of the transmission terminal.

Furthermore, the example of display described above may be modified as follows. When display data are transmitted from an information providing device 30, the display data are assigned to the entire screen (display region A2) so that the display data are displayed on the entire screen as illustrated in FIG. 15. Then, when a predetermined button (a cursor key, for example) of the transmission terminal 10 is pressed by the user and the input of the predetermined button is received by the operational input receiving unit 12, the display control unit 17 switches the screen to the screen of FIG. 13. Subsequently, the display screen is switched in a cycle in the order of FIG. 14, FIG. 15, FIG. 13, . . . each time the predetermined button is pressed by the user. According to this mode, captured image data transmitted from other transmission terminals 10, that is, persons in other bases can be seen according to situations even when material data are displayed.

Next, processing for an information providing device 30 to instruct the MFP 80 to form images to acquire data from the MFP 80 in the transmission system 1 configured as described above will be described.

Figure 16:
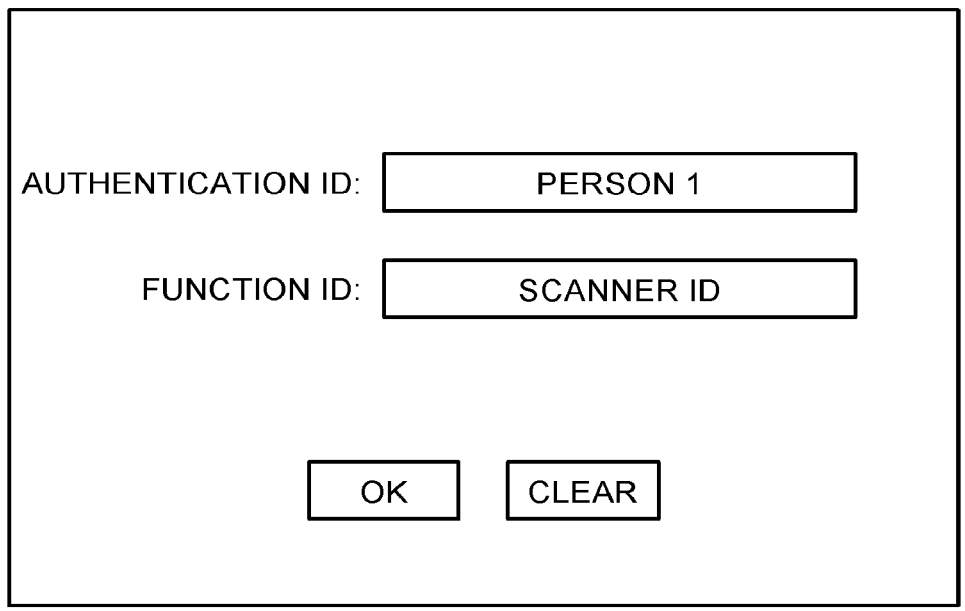
FIG. 16 is a diagram illustrating a login screen displayed when connecting to the MFP.

First, a user who is a participant of a conference starts connection between the information providing device 30 and the MFP 80 to instruct the MFP 80 to form (scan or print) images. Specifically, a display control unit 34 of the information providing device 30 displays a login screen illustrated in FIG. 16 on the display 306. The user enters an authentication ID and a function ID representing the instruction to form images on the login screen. FIG. 16 illustrates an example in which a scanning ID is entered as the function ID and instruction to the MFP 80 to scan a set document is made as the instruction to form images.

When the authentication ID, the function ID and OK are input on the login screen, the inputs are received by the operational input receiving unit 33. The user then brings the information providing device 30 close to or in contact with the MFP 80 so that NFC communication is performed. In this process, when the operational input receiving unit 33 receives the inputs, the display control unit 34 displays a navigation screen illustrated in FIG. 17 on the display 306 to instruct the user to bring the information providing device 30 into contact. On this navigation screen, a file name to be given to data received by the MFP 80 is also entered. Note that the configuration may be such that such a navigation screen is not displayed. In the case of such configuration, the OK button in FIG. 16 may be eliminated.

Figure 18:
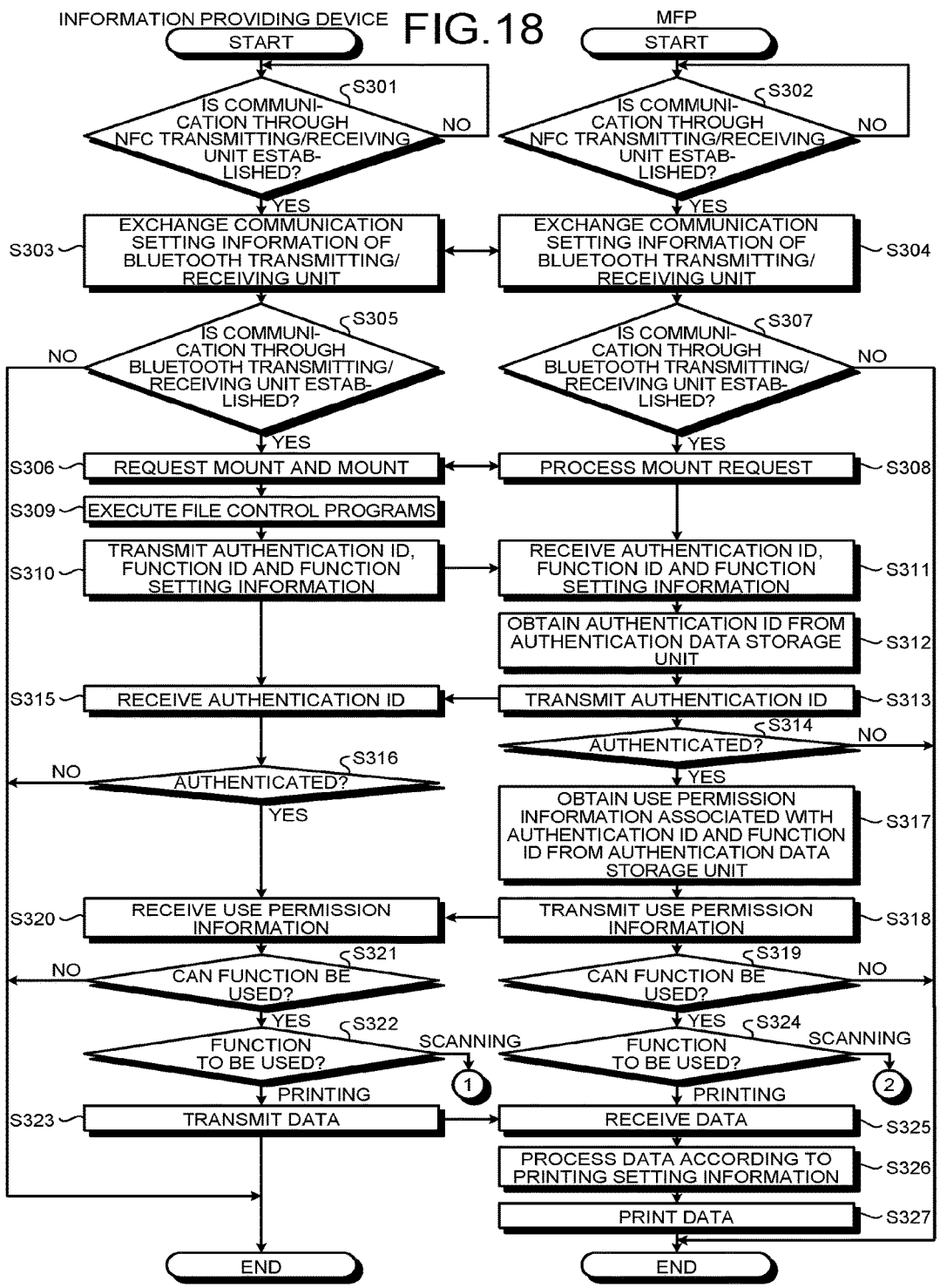
FIG. 18 is a flowchart illustrating wireless communication establishment procedures and data processing procedures performed by the transmission system.
Figure 19:
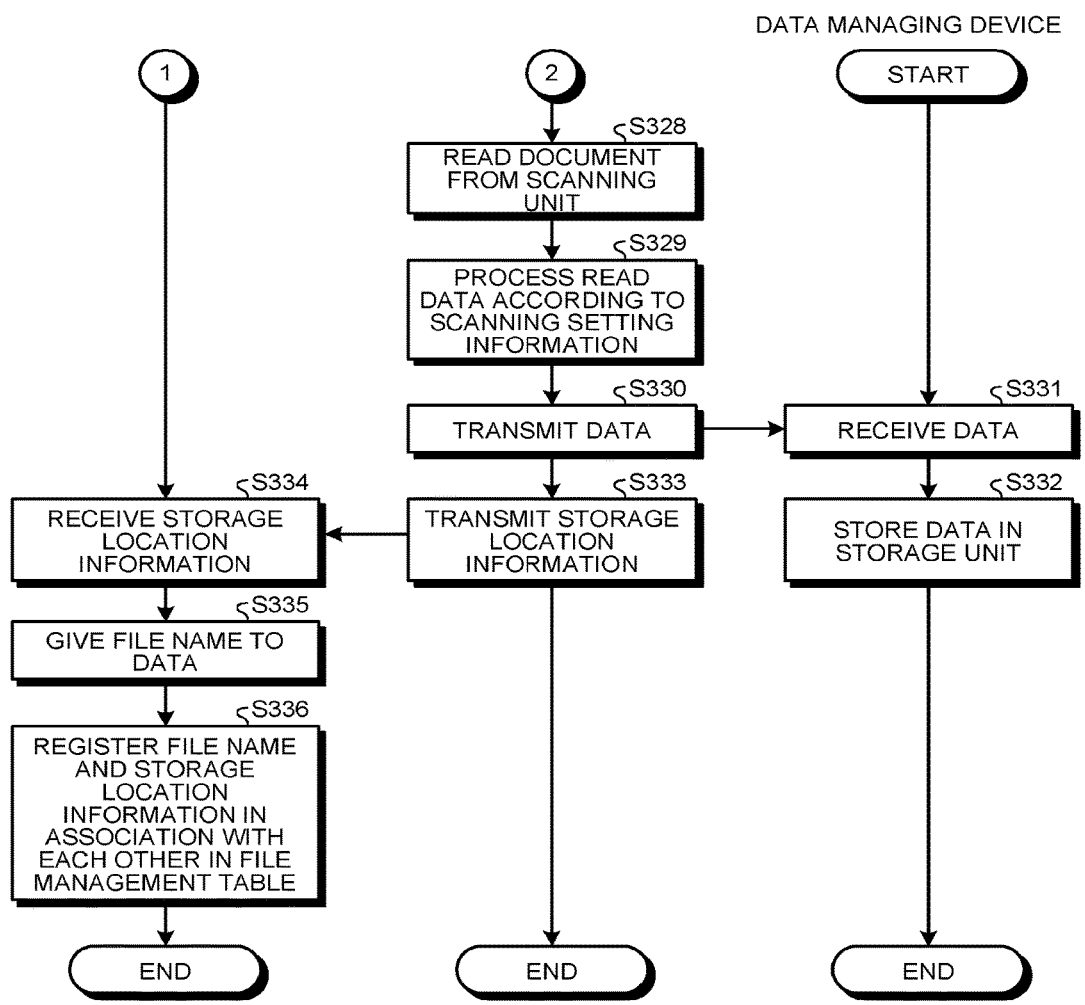
FIG. 19 is a flowchart illustrating wireless communication establishment procedures and data processing procedures performed by the transmission system.

Then, establishment of wireless communication and data processing are performed as follows. FIGS. 18 and 19 are flowcharts illustrating wireless communication establishment procedures and data processing procedures performed by the information providing device 30 and the MFP 80.

First, in the information providing device 30, the NFC transmitting/receiving unit 31 determines whether or not communication with the NFC transmitting/receiving unit 85 of the MFP 80 is established (step S301). If it is determined that the communication with the NFC transmitting/receiving unit 85 of the MFP 80 is not established, that is, the information providing device 30 is not present within the communication range (step S301: No), the processing returns to step S301, which is repeated until the communication with the NFC transmitting/receiving unit 85 of the MFP 80 is established.

Similarly, in the MFP 80, the NFC transmitting/receiving unit 85 determines whether or not communication with the NFC transmitting/receiving unit 31 of the information providing device 30 is established (step S302). If it is determined that the communication with the NFC transmitting/receiving unit 31 of the information providing device 30 is not established, that is, the information providing device 30 is not present within the communication range (step S302: No), the processing returns to step S302, which is repeated until the communication with the NFC transmitting/receiving unit 31 of the information providing device 30 is established.

Next, if it is determined that the communication with the NFC transmitting/receiving unit 31 of the information providing device 30 is established, that is the information providing device 30 is present within the communication range of the MFP 80 (step S302: Yes), the NFC transmitting/receiving unit 85 exchanges communication setting information with the information providing device (steps S303 and S304). Specifically, the NFC transmitting/receiving unit 85 of the MFP 80 requests the information providing device 30 to transmit the communication setting information, and the NFC transmitting/receiving unit 31 of the information providing device 30 transmits the communication setting information for Bluetooth communication. In this process, the information providing device 30 may transmit an authentication ID, a function ID and function setting information with the communication setting information.

In the information providing device 30, the Bluetooth transmitting/receiving unit 32 determines whether or not the communication with the Bluetooth transmitting/receiving unit 86 of the MFP 80 is established (step S305). If it is determined that the communication with the Bluetooth transmitting/receiving unit 86 of the MFP 80 is not established (step S305: No), the processing is terminated. If it is determined that the communication with the Bluetooth transmitting/receiving unit 86 of the MFP 80 is established (step S305: Yes), the file control unit 39 transmits a mount request to the MFP 80 via the Bluetooth transmitting/receiving unit 32 to perform mounting (step S306). The mounting will be described later.

In the meantime, in the MFP 80, the Bluetooth transmitting/receiving unit 86 determines whether or not communication with the Bluetooth transmitting/receiving unit 32 of the information providing device 30 is established (step S307). If it is determined that the communication with the Bluetooth transmitting/receiving unit 32 of the information providing device 30 is not established (step S307: No), the processing is terminated.

If it is determined that the communication with the Bluetooth transmitting/receiving unit 32 of the information providing device 30 is established (step S307: Yes), the Bluetooth transmitting/receiving unit 86 of the MFP 80 receives the mount request, and the data processor 84 performs mounting (step S308).

Processing of the information providing device 30 and the MFP 80 in steps S306 and S308 will be described in detail. The file control unit 39 of the information providing device 30 transmits the mount request to the MFP 80 via the Bluetooth transmitting/receiving unit 32. When the Bluetooth transmitting/receiving unit 86 of the MFP 80 receives the mount request, the data processor 84 transmits permission of mounting file control programs to the information providing device 30 via the Bluetooth transmitting/receiving unit 86.

In the information providing device 30, when the Bluetooth transmitting/receiving unit 32 receives the permission of mounting, the file control unit 39 accesses the file control program storage unit 801 of the MFP 80 via the Bluetooth transmitting/receiving unit 32, reads the file control programs stored in the file control program storage unit 801 and mounts the programs on a file system of the information providing device 30. In other words, the file control programs are stored in the storage unit 38.

When the mounting on the storage unit 38 is completed, the file control unit 39 of the information providing device 30 executes the file control programs stored in the storage unit 38 (step S309). As a result, the file control programs function as part of the file control unit 39.

Thus, since the user of the information providing device 30 can bring the information providing device 30 close to the MFP 80 to mount the file control programs thereon at a desired timing, the file control programs need not be installed in advance in the information providing device 30, which can increase the convenience for the user.

Next, the NFC transmitting/receiving unit 31 of the information providing device 30 transmits the authentication ID, the function ID and the function setting information to the NFC transmitting/receiving unit 85 of the MFP 80 (step S310). Note that the case in which the information providing device 30 is present within the communication range refers to such a case in which the user brings the NFC transmitting/receiving unit 31 of the information providing device 30 into contact with the NFC transmitting/receiving unit 85 of the MFP 80, by which it is possible to ensure the instruction to the MFP 80 that the user wants to use.

In the meantime, the NFC transmitting/receiving unit 85 of the MFP 80 receives the authentication ID, the function ID and the function setting information transmitted from the NFC transmitting/receiving unit 31 of the information providing device 30 (step S311). The authentication unit 88 obtains an authentication ID from the authentication data storage unit 89 (step S312). The NFC transmitting/receiving unit 85 transmits the authentication ID obtained from the authentication data storage unit 89 to the information providing device 30 (step S313). The authentication unit 88 compares the authentication ID obtained from the authentication data storage unit 89 with the authentication ID transmitted from the information providing device 30 to determine whether or not to permit the use of an MFP 80 (step S314). If it is determined that the use of the MFP 80 is not to be permitted, that is the received authentication ID is not stored in the authentication data storage unit 89 (step S314: No), the processing is terminated.

Figure 20:
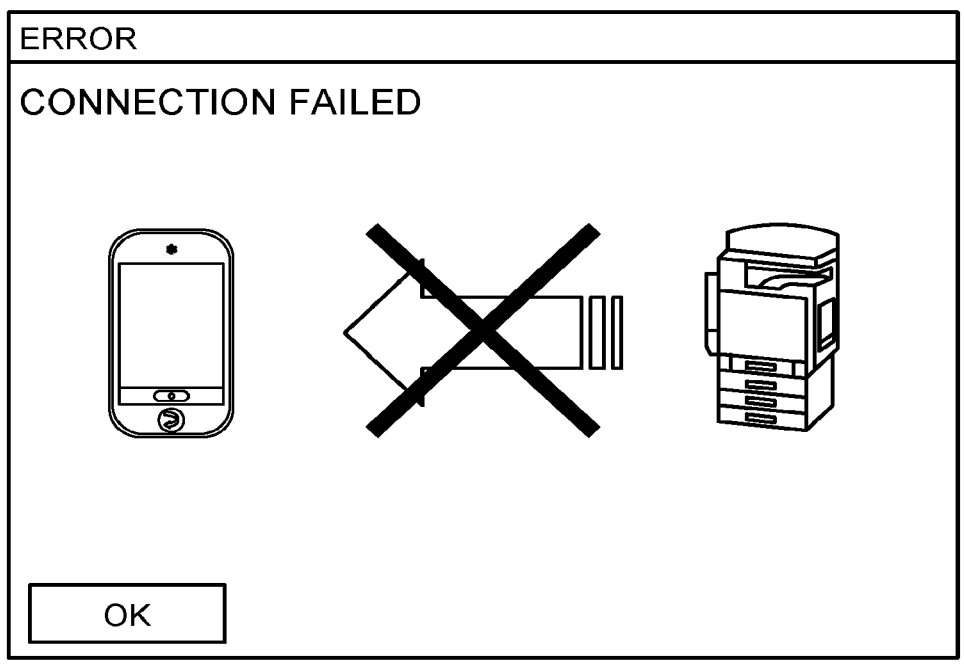
FIG. 20 is a diagram illustrating an example of an error screen.

In the information providing device 30, the NFC transmitting/receiving unit 31 receives the authentication ID transmitted from the MFP 80 (step S315). The NFC transmitting/receiving unit 31 determines whether or not to permit the user of the MFP 80 on the basis of the received authentication ID (step S316). If it is determined that the use of the MFP 80 is to be permitted on the basis of the received authentication ID (step S316: Yes), the processing is continued. If it is determined that the use of the MFP 80 is not to be permitted (step S316: No), the display control unit 34 displays an error screen illustrated in FIG. 20 on the display 306 and terminates the processing.

If it is determined at the MFP 80 that the use of the MFP 80 is to be permitted, that is, the received authentication ID is stored in the authentication data storage unit 89 (step S314: Yes), the use permission determining unit 87 obtains use permission information associated with the authentication ID and the function ID received from the information providing device 30 from the authentication data storage unit 89 (step S317). The NFC transmitting/receiving unit 85 transmits the use permission information obtained from the authentication data storage unit 89 to the information providing device 30 (step S318). The use permission determining unit 87 determines whether or not the function specified by the obtained use permission information can be used (step S319). If it is determined that the specified function cannot be used (step S319: No), the processing is terminated.

In the information providing device 30, the NFC transmitting/receiving unit 31 receives the use permission information transmitted from the MFP 80 (step S320). The NFC transmitting/receiving unit 31 determines whether or not the function of the MFP 80 can be used on the basis of the received use permission information (step S321). If it is determined that the function of the MFP 80 can be used (step S321: Yes), the processing is continued. If it is determined that the function of the MFP 80 cannot be used (step S321: No), the processing is terminated.

Next, in the information providing device 30, the file control unit 39 determines the function to be used (step S322). If it is determined that the function to be used is printing (step S322: printing), data stored in the storage unit 38 are transmitted to the MFP 80 (step S323).

If it is determined at the MFP 80 that the specified function can be used (step S319: Yes), the use permission determining unit 87 determines the function to be used (step S324). If it is determined that the function to be used is printing, that is, the function ID is the printing ID (step S324: printing), the Bluetooth transmitting/receiving unit 86 receives the data transmitted from the information providing device 30 (step S325). In this process, the received data are data before being processed according to printing setting information. When the information providing device 30 has a data processing function, the information providing device 30 may receive the processed data and print the received data. Alternatively, data processing corresponding to part of the printing setting information may be performed at the information providing device 30 and the remaining data processing may be performed at the MFP 80 according to the printing setting information transmitted from the information providing device 30. The data processor 84 processes the received data for printing according to the printing setting information (step S326). The printing setting information may be provided by a printer driver or may be embedded in the data in a form of a description language such as the portable document format (PDF) or the PostScript. The printing unit 81 prints the processed data (step S327).

If it is determined in step S324 that the function to be used is scanning, that is, the function ID is the scanning ID (step S324: scanning), the scanning unit 82 reads a document (step S328). The data processor 84 processes the read data according to scanning setting information (step S329). The transmitting/receiving unit 800 transmits the processed data to the data managing device 90 together with a data ID for identifying the data (step S330).

In the data managing device 90, the transmitting/receiving unit 91 receives the data together with the data ID transmitted from the transmitting/receiving unit 800 of the MFP 80 (step S331). When the data are received, the storage/read processor 93 stores the received data in association with the data ID in the storage unit 94 (step S332). The location in which the data are stored is a storage location indicated in a storage location information that is specified by the MFP 80.

In the MFP 80, data are transmitted to the data managing device 90 in step S330 and the Bluetooth transmitting/receiving unit 86 transmits the data ID of the data transmitted to the data managing device 90 and the storage location information of the data in association with each other to the information providing device 30 (step S333).

In the information providing device 30, the Bluetooth transmitting/receiving unit 32 receives the data ID and the storage location information form the MFP 80 (step S334). Upon receiving the data, the file control unit 39 gives the fine name entered on the navigation screen in FIG. 17 to the received data (step S335).

Figure 17:
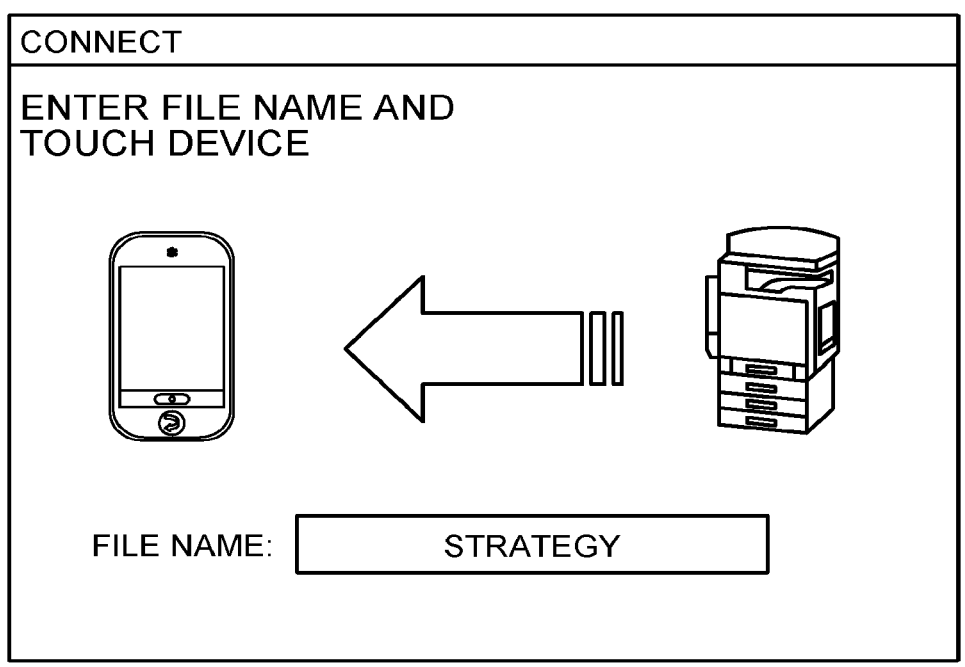
FIG. 17 is a navigation screen displayed when connecting to the MFP.

In this process, if the navigation screen illustrated in FIG. 17 is not displayed or if a file name is not entered on the navigation screen, the file control unit 39 acquires the date and time and generates a file name from the date and the time. For example, in a case of 10 minutes and 30 seconds past 10 o'clock of Sep. 1, 2011, the file control unit 39 generates a file name of "20110901101030.pdf". The file name is exemplary only and is not limited to the above.

Subsequently, the file control unit 39 registers the file name for the data identified by the received data ID in association with the storage location information in the file management table of the storage unit 38 illustrated in FIG. 10 (step S336).

In this manner, the information providing device 30 can cause the MFP 80 to scan the document set at the MFP 80 only by being brought close to the MFP and instruct the scanning. Furthermore, the MFP 80 can store the data obtained by the scanning in the data managing device 90, and the information providing device 30 can receive the data from the data managing device 90 at a desired timing.

In other words, since the information providing device 30 can have stored therein only an URL of real data obtained by the MFP 80 and receive the data when necessary instead of storing the real data, it is possible to save the memory capacity of the information providing device 30. In particular, the memory capacity is often relatively small when the information providing device is a portable terminal device, and this is particularly effective in such a case.

Furthermore, since the information providing device 30 and the MFP 80 can transmit the communication setting information necessary for the Bluetooth communication through the NFC communication and establish the Bluetooth communication by using the transmitted communication setting information, the communication with the MFP 80 can be easily performed only by bringing the information providing device 30 close to the MFP 80. Still further, since the functions of the MFP 80 can be used by transmitting instruction of the function to be used at the MFP 80 from the information providing device 30 through the NFC communication without any operation for transmission/reception of data or setting for the data at the MFP 80, the workload of the user can be reduced.

Alternatively, the configuration may be such that the function setting information is transmitted from the information providing device 30 to the MFP 80, a document is read by the scanning unit 82 of the MFP 80, and the read data may be transmitted to another MFP or a facsimile device after being subjected to data processing according to the function setting information.

Next, operation for connecting an information providing device 30 to a transmission terminal 10 that in in a state connected with another transmission terminal 10 will be described.

Figure 21:
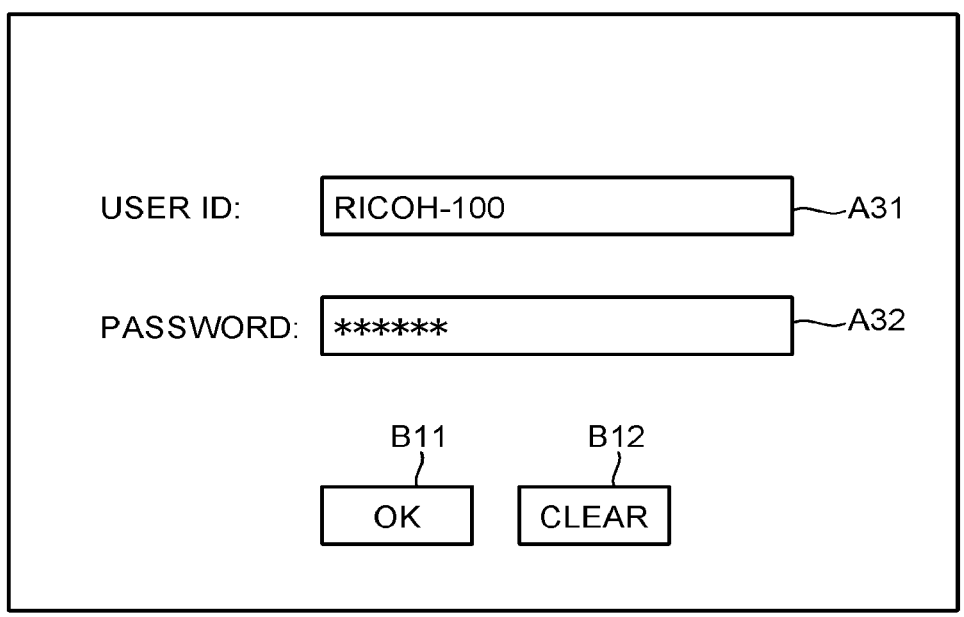
FIG. 21 is a diagram illustrating an example of a login screen displayed on a display of the information providing device.

First, at the information providing device 30, when predetermined operation for starting the use of the present device is received by the operational input receiving unit 33, the display control unit 34 displays a login screen as illustrated in FIG. 21 on the display 306. Note that a region A31 and a region A32 are regions for entering authentication information (user ID, password). Although the detailed flow of processing will be described later, the configuration is such that the function of the display data acquiring unit 35 of the information providing device 30 can be used by entering authentication information registered in the authentication table 232 of the transmission terminal 10 to be connected with the information providing device 30 into the region A31 and the region A32.

An OK button B11 is a button for instructing to inform the CPU 301 (the operational input receiving unit 33) of the information providing device 30 of the authentication information entered in the region A31 and the region A32. A clear button B12 is a button for instructing to clear the authentication information entered in the region A31 and the region A32, and when the clear button B12 is pressed, the display control unit 34 clears the authentication information entered in the region A31 and the region A32.

Figure 22:
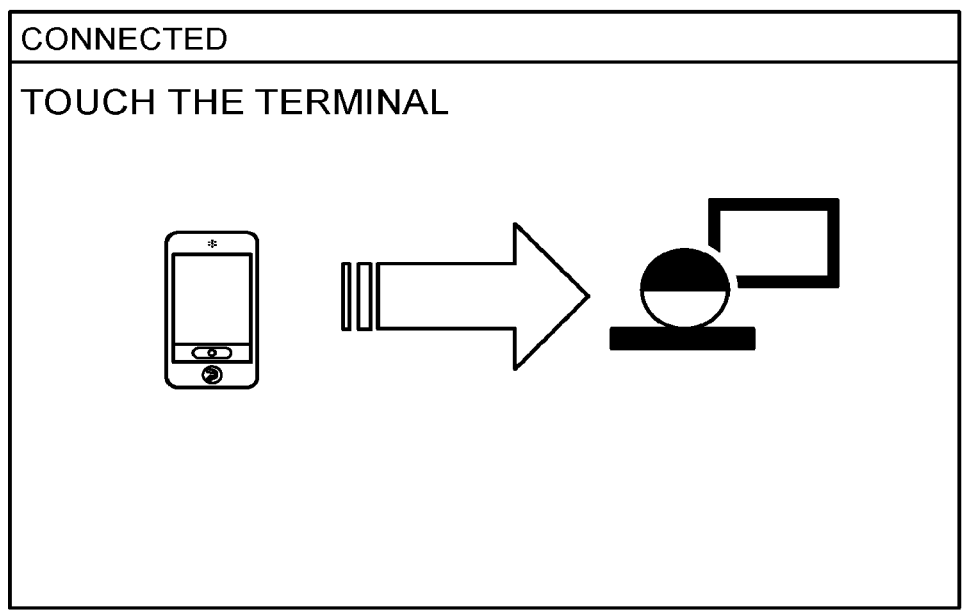
FIG. 22 is a diagram illustrating an example of a navigation screen displayed on the display of the information providing device.

When the authentication information is entered in the region A31 and the region A32 via the operation button 308 and the operation panel 309 of the information providing device 30 and then the OK button B11 is pressed by the user of the information providing device 30, the operational input receiving unit 33 receives the entered authentication information. In response to the pressing of the OK button B11, the display control unit 34 displays a navigation screen for guiding operating procedures as illustrated in FIG. 22 on the display 306. The navigation screen of FIG. 22 prompts to bring the information providing device 30 into contact with the transmission terminal 10, that is, to perform NFC communication between the transmission terminal 10 and the information providing device 30.

When the user brings the information providing device 30 into contact with (close to) the transmission terminal 10 according to the navigation screen, the NFC communication between the NFC transmitting/receiving unit (first communication I/F 312) of the information providing device 30 and the NFC transmitting/receiving unit (first communication I/F 111) of the transmission terminal 10 is established. With the establishment of the NFC communication, the display control unit 34 clears the screen of FIG. 22 from the display 306.

The Bluetooth transmitting/receiving unit 32 of the information providing device 30 communicates with the Bluetooth transmitting/receiving unit 22 of the transmission terminal 10 by using connection setting information of the transmission terminal 10 acquired through the NFC communication, and performs mounting of the storage unit 23 on the transmission terminal 10. When the mounting of the storage unit 23 is successful, the CPU 301 of the information providing device 30 then executes the display data acquisition program 233 stored in the storage unit 23 to implement the display data acquiring unit 35. Procedures of processing until the display data acquisition program 233 for the transmission terminal 10 is started by the information providing device 30 will be described below with reference to FIG. 23.

Figure 23:
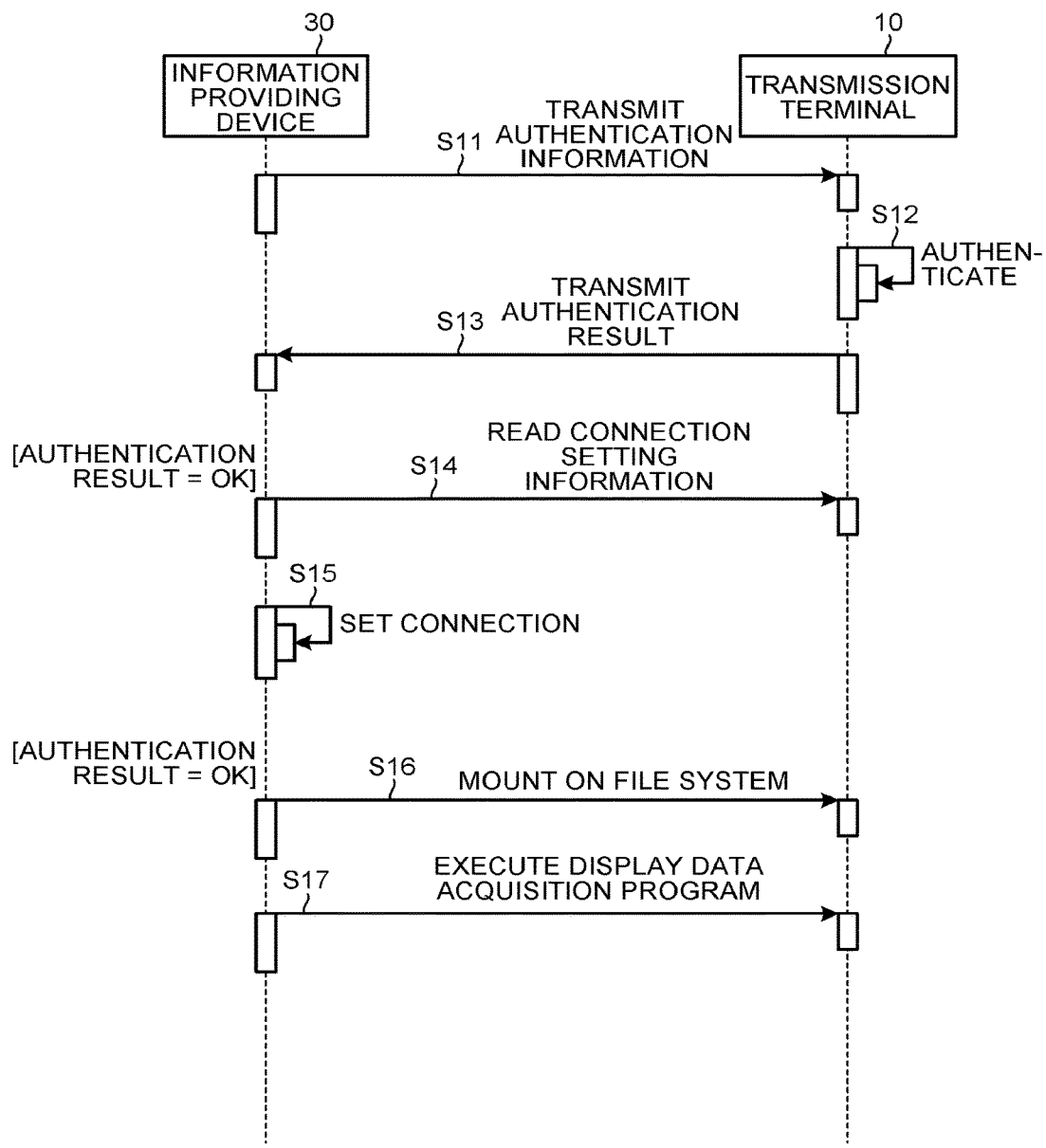
FIG. 23 is a diagram for explaining procedures of processing until a display data acquisition program for the transmission terminal is started by the information providing device.

FIG. 23 is a diagram for explaining procedures of processing until the display data acquisition program 233 for the transmission terminal 10 is started by the information providing device 30. First, when the NFC communication is established between the information providing device 30 and the transmission terminal 10, the NFC transmitting/receiving unit 31 of the information providing device 30 transmits the authentication information described above input by the user and received by the operational input receiving unit 33 to the NFC transmitting/receiving unit 21 of the transmission terminal (step S11).

In the meantime, at the transmission terminal 10, when the NFC transmitting/receiving unit 21 receives the authentication information, the external information determining unit 20 refers to the authentication table 232 stored in the storage unit 23 to authenticate (verify) the authentication information received by the NFC transmitting/receiving unit 21 (step S12). Specifically, the external information determining unit 20 of the transmission terminal 10 determines whether or not a user ID contained in the authentication information received from the information providing device 30 exists in the user ID column of the authentication table 232 and whether or not a password in the password column on the same line as the user ID is identical to a password contained in the authentication information. If it is determined that the passwords are identical, the NFC transmitting/receiving unit 21 transmits an OK signal indicating that the authentication is accepted from the NFC transmitting/receiving unit 21 of the transmission terminal 10 to the NFC transmitting/receiving unit 31 of the information providing device 30 (step S13).

Figure 24:
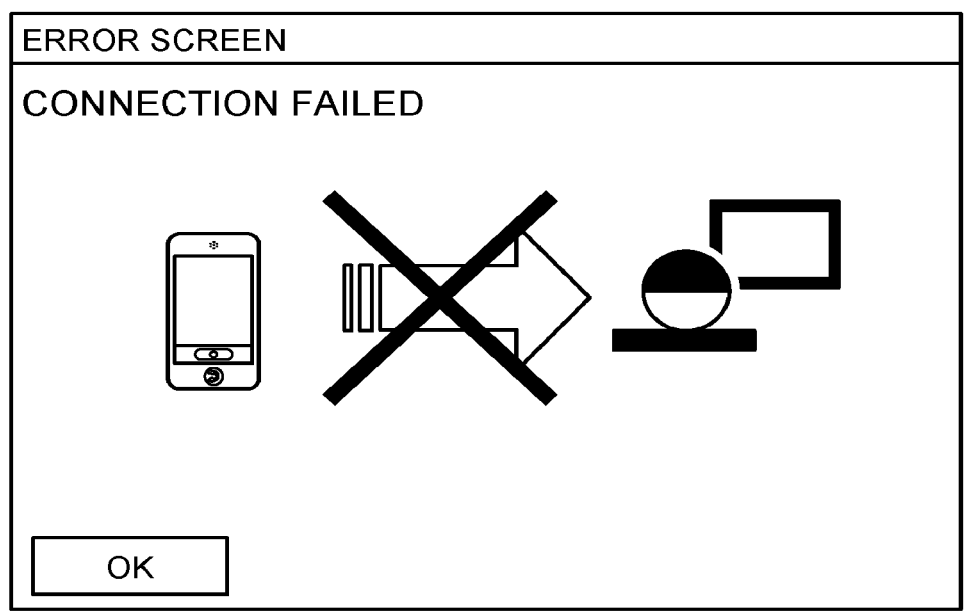
FIG. 24 is a diagram illustrating an example of an error screen displayed on the display of the information providing device.

If the conformity to the user ID and the password registered in the authentication table 232 cannot be confirmed as a result of the authentication by the external information determining unit 20, the NFC transmitting/receiving unit 21 transmits an NG signal indicating that the authentication is rejected from the NFC transmitting/receiving unit 21 of the transmission terminal 10 to the NFC transmitting/receiving unit 31 of the information providing device 30. At the information providing device 30 that has received the NG signal, the display control unit 34 displays an error screen as illustrated in FIG. 24 and the processing is terminated.

Upon receiving the OK signal from the NFC transmitting/receiving unit 21 of the transmission terminal 10, the NFC transmitting/receiving unit 31 of the information providing device 30 reads the connection setting information held by the NFC transmitting/receiving unit 21, that is, the connection setting information for the second communication I/F 112 (Bluetooth transmitting/receiving unit 22) necessary for the Bluetooth communication (step S14).

Subsequently, the Bluetooth transmitting/receiving unit 32 of the information providing device 30 performs connection settings for the Bluetooth (registered trademark) communication by using the connection setting information read by the NFC transmitting/receiving unit 31 in step S14 (step S15). The Bluetooth transmitting/receiving unit 22 of the transmission terminal 10 starts connection with the Bluetooth transmitting/receiving unit 32 according to the connection settings, and transmits an OK signal to the Bluetooth transmitting/receiving unit 32 if the connection result is successful. If the connection result is a failure, on the other hand, the Bluetooth transmitting/receiving unit 22 of the transmission terminal 10 transmits an NG signal to the Bluetooth transmitting/receiving unit 32.

At the information providing device 30, when it is determined that the Bluetooth transmitting/receiving unit 32 is in a state capable of performing the Bluetooth (registered trademark) communication, that is, the OK signal is received from the Bluetooth transmitting/receiving unit 22, the display data communication unit 36 accesses the storage unit 23 of the transmission terminal 10 via the Bluetooth transmitting/receiving unit 32 and the Bluetooth transmitting/ receiving unit 22 and mounts the storage unit 23 on the file system of the information providing device (step S16). If the connection result from the Bluetooth transmitting/receiving unit 22 is the NG signal, the display control unit 34 of the information providing device 30 displays the error screen as illustrated in FIG. 24 and the processing is terminated.

When mounting of the storage unit 23 is completed, the display data communication unit 36 of the information providing device 30 accesses the file of the display data acquisition program 233 stored in the storage unit 23 and executes the display data acquisition program 233 (step S17). When the display data acquisition program 233 is executed, the function as the display data acquiring unit 35 is implemented at the information providing device 30 and the display data displayed by the display control unit 34 of the information providing device 30 can be acquired.

Figure 25:
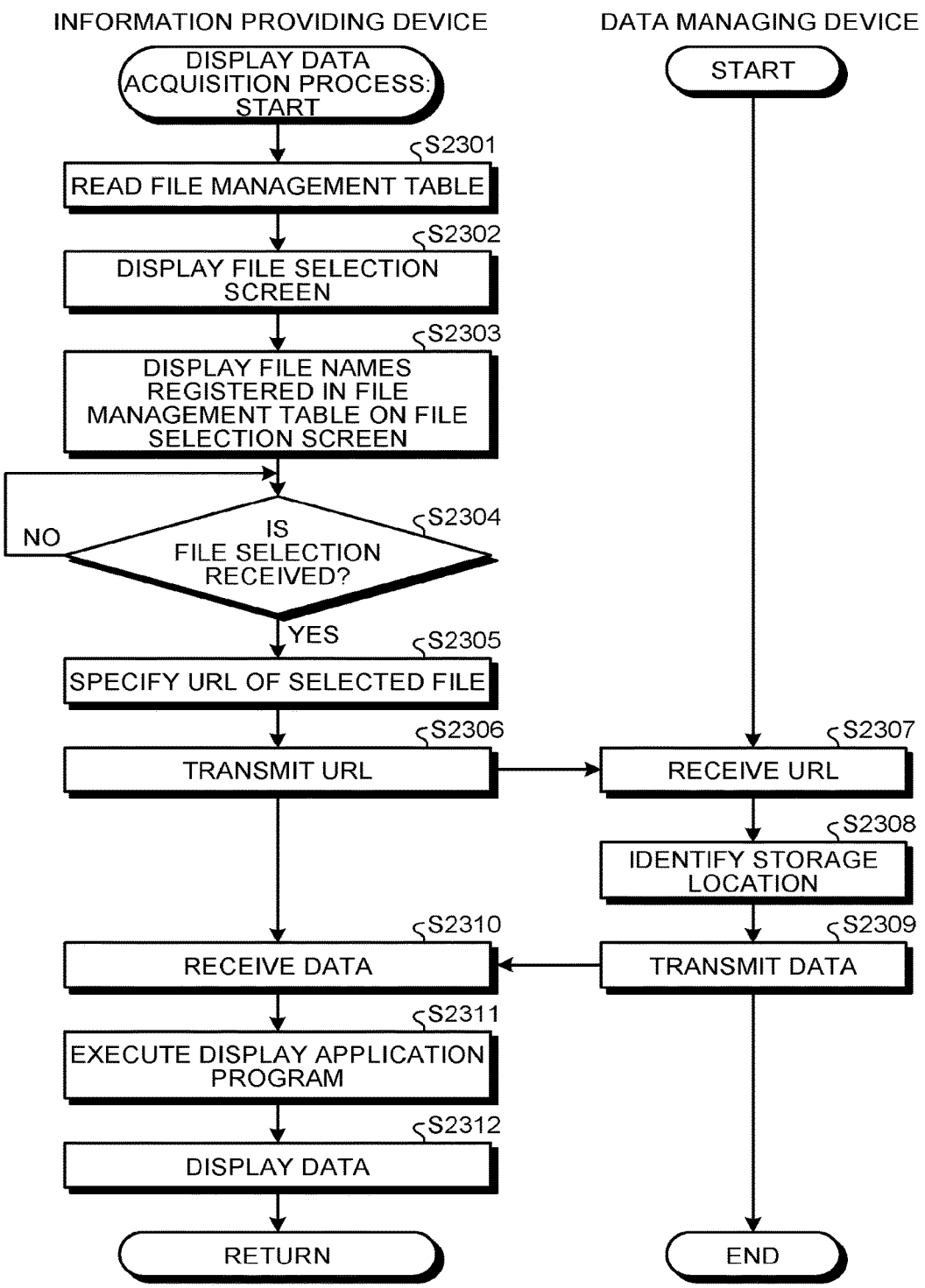
FIG. 25 is a flowchart illustrating procedures of a display data acquisition process.

Details of the display data acquisition process performed by the information providing device 30 will be described here. FIG. 25 is a flowchart illustrating procedures of the display data acquisition process. First, the storage/read processor 37 of the information providing device 30 reads out the file management table from the storage unit 38 (step S2301). Then, the display control unit 34 displays a file selection screen on the display 306 (step S2302). Next, the display control unit 34 displays all the file names registered in the file management table on the file selection screen (step S2303). Subsequently, the information providing device 30 enters a state waiting for receiving file selection by the user (step S2304: No).

Figure 26:
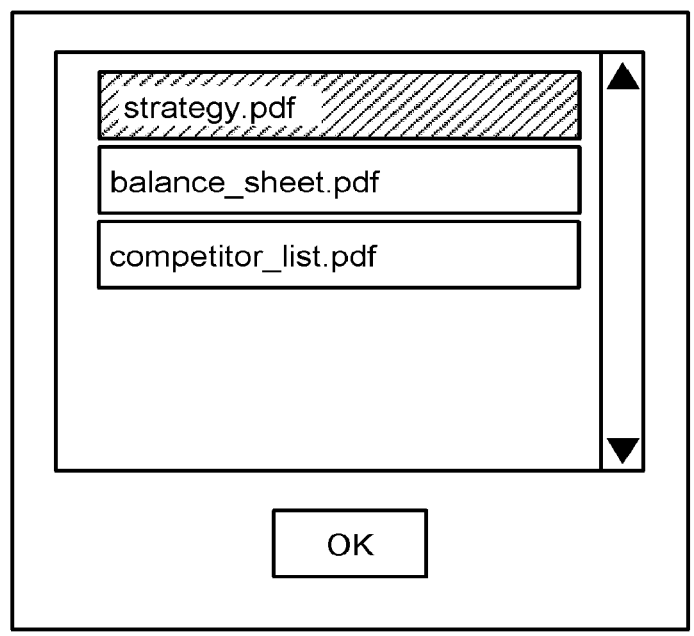
FIG. 26 is a diagram illustrating an example of a file selection screen.

FIG. 26 is a schematic diagram illustrating an example of the file selection screen on which a list of file names is displayed. As illustrated in FIG. 26, the list of file names registered in the file management table illustrated in FIG. 10 is displayed in a manner in which the user can select a file name. Note that the storage location is no displayed on the file selection screen.

Then, if the selection of a file name made by the user through the file selection screen is received (step S2304: Yes), the display data acquiring unit 35 refers to the storage location information associated with the selected file name in the file management table to identify the URL of the selected file (step S2305). Subsequently, the transmitting/receiving unit 320 transmits the identified URL to the data managing device 90 (step S2306).

At the data managing device 90, the transmitting/receiving unit 91 receives the URL from the information providing device 30 (step S2307). Subsequently, the server unit 92 analyzes the received URL to identify the storage location in which the specified data are stored (step S2308), and instructs the storage/read processor 93 to read the data from the identified storage location. Subsequently, the transmitting/receiving unit 91 transmits the data read by the storage/read processor 93 to the information providing device 30 (step S2309).

At the information providing device 30, the transmitting/receiving unit 320 receives the data from the data managing device 90 (step S2310). Subsequently, the display data acquiring unit 35 executes a display application program stored in the storage unit 38 (step S2311) and instructs the display control unit 34 to display the selected file, and the display control unit 34 displays the selected file (data) (step S2312).

In this manner, the information providing device 30 can identify data desired by the user in response to simple operation made by the used and display the identified data on the information providing device 30. The information providing device 30 can further transmit the identified data to the transmission terminal 10. As a result, since display data can be shared among a plurality of user at the transmission terminals 10, the convenience of remote conferencing can be improved.

While a mode in which the user of the information providing device 30 is made to manually input the authentication information is employed as illustrated in the login screen in FIG. 21 in the example described above, a mode in which the input of authentication information performed by the user is eliminated by storing the authentication information in advance in a storage medium that can be referred by the NFC transmitting/receiving unit 31 at the time of shipping of the information providing device 30 may be employed. According to the procedures in this case, the processing for displaying the login screen described above may be eliminated before starting the processing.

As described above, since the function of the display data acquiring unit 35 is not implemented when the authentication is performed at connection between the information providing device 30 and the transmission terminal 10 and the authentication result is rejection of the authentication, it is possible to prevent display data from being inadvertently transmitted to the transmission terminal 10 and to prevent leakage in a case where the display data are confidential information. Since the display data communication unit 36 of the information providing device 30 mounts the storage unit 23 of the transmission terminal 10 and performs the display data acquisition program 233 when the information providing device 30 and the transmission terminal 10 is connected, it is not necessary to install the program in advance in the information providing device 30, which can reduce the burden of the user for preparing for a conference. Moreover, it is also possible to save the capacity of the storage unit 38 of the information providing device 30. Furthermore, data obtained by scanning at the MFP 80 can be easily shared among the transmission terminals 10.

Figure 27A:
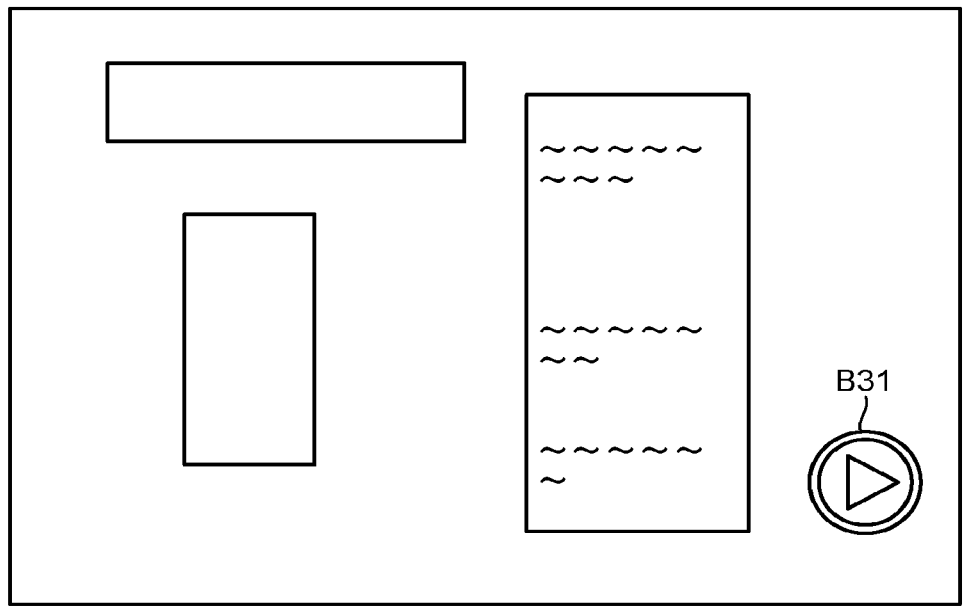
FIG. 27A is a diagram illustrating an example of a display screen displayed on the display of the information providing device.
Figure 27B:
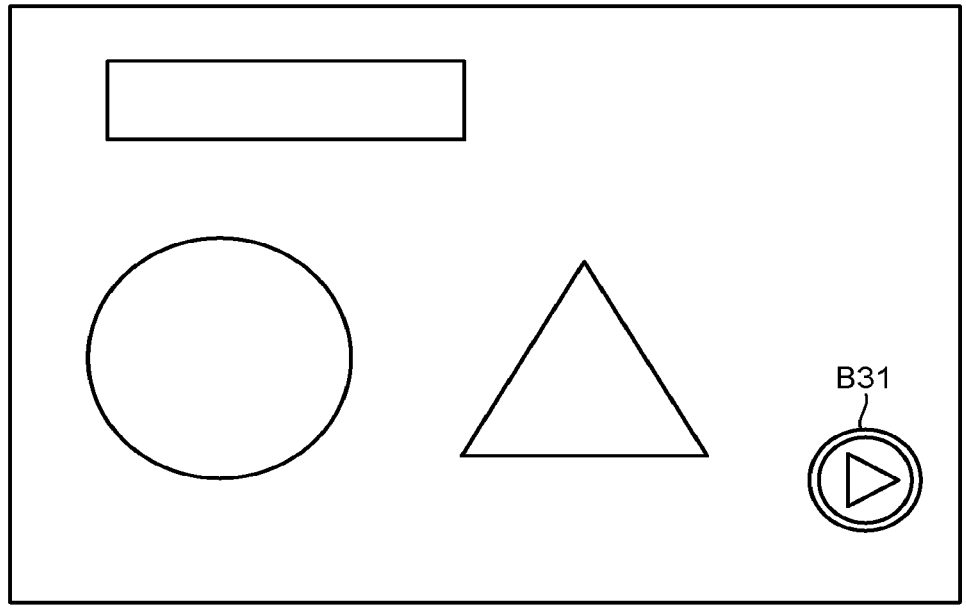
FIG. 27B is a diagram illustrating an example of a display screen displayed on the display of the information providing device.

Next, processing for transmitting display data displayed on an information providing device 30 to a transmission terminal 10 will be described with reference to FIGS. 27A, 27B and 28. The display data acquiring unit 35 of the information providing device 30 implemented in the information providing device 30 by executing the display data acquisition program 233 displays a start button B31 as an operational input unit for instructing to start transmission of the display data on the display 306 as illustrated in FIG. 27A or FIG. 27B. FIGS. 27A and 27B are diagrams illustrating display screens displayed on the display 306 of the information providing device 30, and illustrate examples in which different contents (display data) are displayed.

When pressing of the start button B31 is detected via the operational input receiving unit 33, the display data acquiring unit 35 acquires display data on the screen displayed on the display 306 and uses the display data communication unit 36 to transmit the acquired display data to the transmission terminal 10. Note that the start button B31 displayed on the display 306 is preferably not contained in the display data. A process for transmitting the display data from the information providing device 30 will be described below.

FIG. 28 is a diagram for explaining procedures of the process for transmitting the display data from the information providing device 30. In FIG. 28, an example in which two information providing devices 30 (30a, 30c) and two transmission terminals 10 (10aa, 10ca) are used is illustrated to avoid complication of the description, but the numbers thereof are not limited thereto and may be three or larger. In this process, a case in which the display data of the information providing device 30 that can be displayed on (shared among) the respective transmission terminals 10 are limited to one piece of data will be described. It is assumed that Bluetooth communication is established between the information providing device 30a and the transmission terminal 10aa and between the information providing device 30c and the transmission terminal 10ca.

In addition, the external information determining unit 20 of each transmission terminal 10 stores a reception flag for holding the reception state of the display data informed by a relay device 40 in the RAM 103 or the like. The reception flag is to store whether or not display data are currently being transmitted from the information providing devices 30, and stores true (being transmitted) or false (not being transmitted) according to the presence or absence of reception of display data. The initial value of the reception flag is false.

An example in which display data are transmitted from the information providing device 30 will be described below. When the operational input receiving unit 33 of the information providing device 30a receives a pressing input of a start button (such as the start button B31) instructing to start transmission of the display data described above (step S21), the display data acquiring unit 35 of the information providing device 30a informs the transmission terminal 10aa of the start of transmission of the display data (step S22).

At the transmission terminal 10aa informed of the start of distribution of the display data, the external information determining unit 20 checks the state of the reception flag (step S23), and if the state is determined to be false, the external information determining unit 20 transmits instruction information (hereinafter referred to as a distribution start request) requesting to start distribution of the display data to a relay device 40 (step S24).

It is assumed that one relay device 40 selected by the function of the narrowing unit 18 described above is used as the relay device 40. In transmission to the relay device 40, addresses such as IP addresses and domain names identified by terminal IDs of other transmission terminals 10 registered in the management table 231 are transmitted together with the address of the present transmission terminal 10 to request transfer to all the transmission terminals 10 (including the present transmission terminal 10) conducting a conference with the present transmission terminal 10 (the same applies hereafter).

When the distribution start request is received from the transmission terminal 10aa, the relay device 40 informs the transmission terminal 10aa that transmitted the distribution start request and the other transmission terminals 10 in communication with the transmission terminal 10aa of a distribution start event informing start of distributing the display data (steps S25 and S26). At the transmission terminal 10aa, when the distribution start event is received from the relay device 40, the external information determining unit 20 transmits information (hereinafter referred to as transmission allowing information) instructing to start transmission of the display data to the information providing device 30a (step S27).

At the information providing device 30a, when the transmission allowing information is received from the transmission terminal 10aa, the display data communication unit 36 transmits the display data acquired by the display data acquiring unit 35 via the transmission terminal 10aa to the respective transmission terminals 10 (step S28). This transmission process is described in detail as follows.

First, the display data acquiring unit 35 of the information providing device 30a acquires the screen displayed on the display 306 as the display data. Subsequently, the display data communication unit 36 transmits the display data acquired by the display data acquiring unit 35 to the transmission terminal 10aa via the Bluetooth transmitting/receiving unit 32.

At the transmission terminal 10aa connected with the information providing device 30a through the Bluetooth communication, when the display data are received from the information providing device 30a, the external information determining unit 20 outputs the display data together with data (such as captured image data) by the image capturing unit 14 and the audio input unit 15 of the present transmission terminal 10aa to the transmitting/receiving unit 11 to transmit the data to the relay device 40 via the communication network 2.

The relay device 40 then transmits (distributes) the data transmitted from the transmission terminal 10aa to the respective transmission terminal 10. In this process, the display data from the information providing device 30a transferred by the relay device 40 is also transmitted to the transmission terminal 10aa that is the source of the display data. In addition, the display control unit 17 of the transmission terminal 10aa displays the data transmitted through the relay device 40 instead of the data before being transmitted to the relay device 40. Similarly, the captured image data captured by the camera 113 of each transmission terminal 10 are also once transmitted to the relay device 40 and the captured image data returned from the relay device 40 are displayed.

As a result of the process described above, the delay times until the display data are received at the respective transmission terminals 10 will be substantially equal regardless of which information providing device 30 the display data are transmitted. Accordingly, since the content displayed on the respective transmission terminals 10 is changed substantially at the same time when the user of the information providing devices 30a turns the pages (displays the next or the previous page) of materials at the information providing device 30, for example, smooth communication can be achieved even at a remote conference. The same applies to captured image data, and the delay times until the captured image data are displayed at the respective transmission terminals 10 can be made substantially equal among all the transmission terminals 10.

Figure 29A:
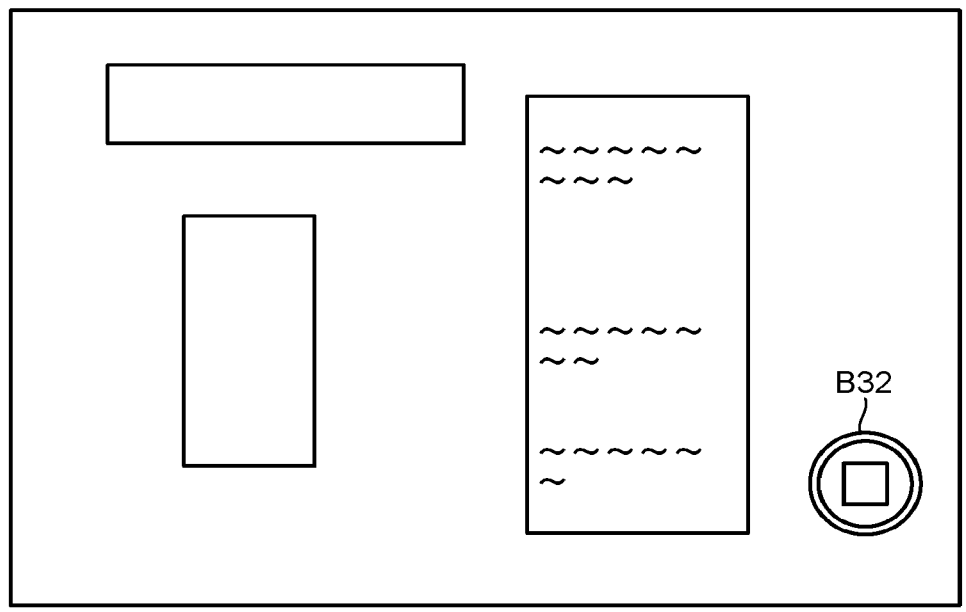
FIG. 29A is a diagram illustrating an example of a display screen displayed on the display of the information providing device.
Figure 29B:
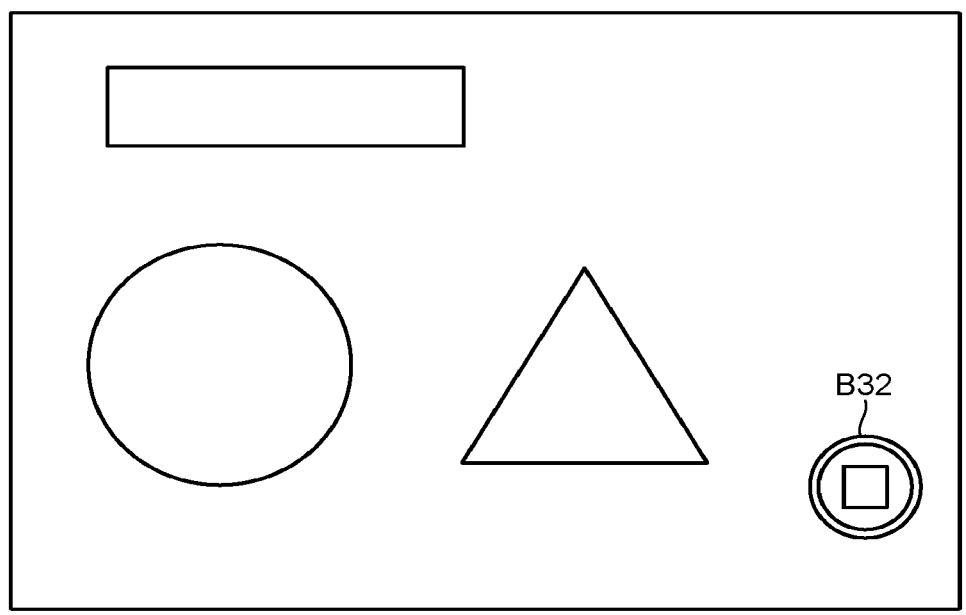
FIG. 29B is a diagram illustrating an example of a display screen displayed on the display of the information providing device.

The description refers back to the process of FIG. 28. At the information providing device 30a, when the display data communication unit 36 starts transmission of the display data, the display data acquiring unit 35 changes the start button for instructing to start distribution displayed on the display 306 to a stop button for instructing to stop the distribution (step S29). FIGS. 29A and 29B are diagrams illustrating display screens displayed on the display 306 of the information providing device 30, and correspond to the screens in FIGS. 27A and 27B, respectively, described above. In FIGS. 29A and 29B, a stop button B32 is a button for instructing to stop distribution of the display data and to which the display of the start button B31 illustrated in FIGS. 27A and 27B is switched as a result of transmission of the display data. As will be described later, the transmission of the display data is stopped when the stop button B32 is pressed.

Referring back to FIG. 28, in each of the transmission terminals 10 that received the display data, the external information determining unit 20 sets the reception flag to true (steps S30 and S31), and the display control unit 17 reconfigures the screen layout of the display data and the captured image data (steps S32 and S33). Specifically, as described with reference to FIG. 14, the display data transmitted from the information providing device 30a are arranged and displayed in the display region A21, and the captured image data captured a the respective transmission terminals 10 are arranged and displayed in display regions sequentially from the display region A22.

As described above, as a result of arranging (displaying) a start button for instructing to start transmission of display data on the display 306 of the information providing device 30, the user can transmit (distribute) the display data to the respective transmission terminals 10 by easy operation of pressing the start button. Moreover, since it is possible to easily check whether or not display data are distributed by switching between the start button and the stop button according to the transmission state of the display data, it is possible to prevent erroneous operation of transmitting information that should not be disclosed.

Next, an example of processing for switching from a state in which display data from the information providing device 30a are being transmitted to transmission of display data from the information providing device 30c will be described with reference to FIG. 30. FIG. 30 is a diagram for explaining procedures of a process for switching a transmission source of display data. The process illustrated in FIG. 30 represents an example in which the start button B31 of the information providing device 30c is pressed after the processing of FIG. 28 described above.

When the operational input receiving unit 33 of the information providing device 30c receives an input of pressing the start button B31 by the user (step S41), the display data acquiring unit 35 of the information providing device 30c informs the transmission terminal 10ca of the start of distribution of the display data (step S42).

At the transmission terminal 10ca informed of the start of distribution of the display data, the external information determining unit 20 checks the state of the reception flag (step S43), and if the state is determined to be true, the external information determining unit 20 transmits instruction information (hereinafter referred to as a distribution stop request) requesting to stop distribution of the display data to the relay device 40 (step S44).

When the distribution stop request is received from the transmission terminal 10ca, the relay device 40 informs the transmission terminal 10ca that transmitted the distribution stop request and other transmission terminals 10 in communication with the transmission terminal 10ca of the distribution stop event informing stop of distribution of the display data (steps S45 and S46).

The external information determining unit 20 of each of the transmission terminals 10 that received the distribution stop event transmits information (hereinafter referred to as transmission stop information) instructing the information providing device 30 connected to the present transmission terminal 10 to stop transmission of the display data (steps S47 and S48). As a result of receiving the transmission stop information, the display data acquiring unit 35 of the information providing device 30a that is currently transmitting the display data stops transmission of display data so as to stop the distribution of the display data to the respective transmission terminals 10 by the relay device 40 (step S49).

Furthermore, upon receiving the transmission stop information, the display data acquiring unit 35 of each information providing device 30 changes the display of the stop button B32 displayed on the display 306 to the start button B31 for instructing start of transmission of display data (steps S50 and S51). As a result of this process, the stop button B32 of the information providing device 30a illustrated in FIG. 29A, etc. is changed to the start button B31 as illustrated in FIG. 27A. Although the change of the display is made similarly in the information providing device 30c, the information providing device 30c is not changed to the eye of the user since the start button B31 is already displayed thereon.

Subsequently, when the external information determining unit 20 of each transmission terminal 10 sets the reception flag to false (steps S52 and S53), the display control unit 17 clears the display data displayed in the display region A21 of the display 306, and rearranges the display screen by arranging and displaying captured image data from the respective transmission terminals 10 in display regions sequentially from the display region A21 (steps S54 and S55). In addition, the external information determining unit 20 of the transmission terminal 10ca transmits a distribution start request to the relay device 40 (step S56) Since similar processing as in steps S25 to S33 described with reference to FIG. 28 is performed in subsequent steps S57 to S65, the description thereof will not be repeated.

As a result, the display data of the information providing device 30c are arranged in the display region A21 of the display screen of each of the transmission terminals 10, and other image data are arranged in display regions sequentially from the display region A22. In addition, even when display data from another base are displayed on the screen of the transmission terminal 10, the user of the present base can transmit display data displayed on the information providing device 30 at the present base to the transmission terminals 10 at respective bases and switch the screen to the display data of the present office by easy operation of pressing the start button of the information providing device 30.

Figure 31:
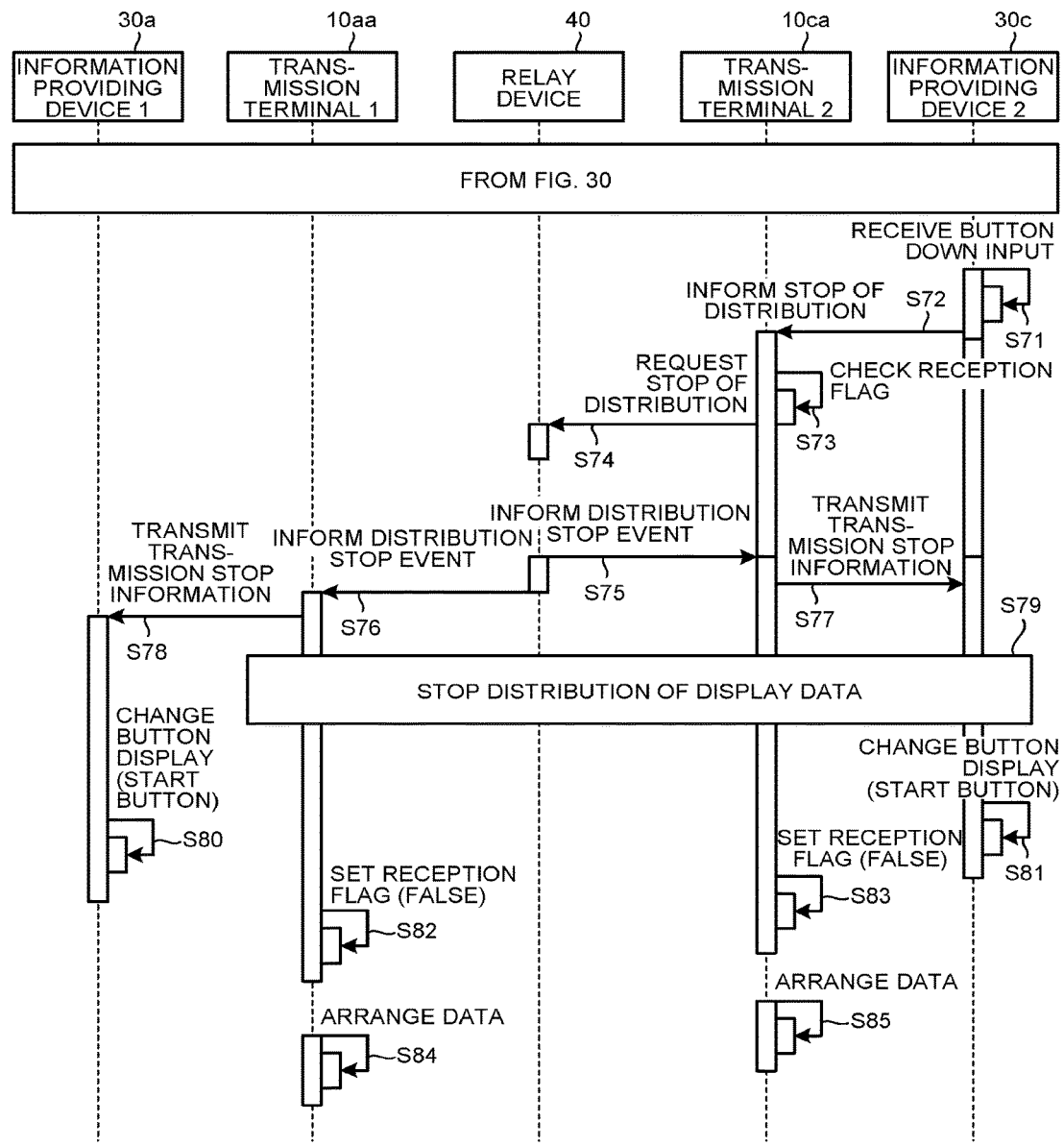
FIG. 31 is a diagram for explaining procedures of a process for stopping transmission of the display data.

Next, an example of a process for stopping display data being transmitted from an information providing device 30 will be described with reference to FIG. 31. FIG. 31 is a diagram for explaining procedures of the process for stopping transmission of the display data. The process illustrated in FIG. 31 represents an example in which the stop button B32 of the information providing device 30c is pressed after the processing of FIG. 30 described above.

When the operational input receiving unit 33 of the information providing device 30c receives an input of pressing the stop button B32 by the user (step S71), the display data acquiring unit 35 of the information providing device 30c informs the transmission terminal 10ca of the stop of distribution of the display data (step S72). Since similar processing as in steps S43 to S55 described with reference to FIG. 30 is performed in subsequent steps S73 to S85, the description thereof will not be repeated.

As a result, transmission of the display data from the information providing device 30c is stopped, and only image data are displayed on the display screen of each transmission terminal 10. Note that image data of bases conducting conversation as described above are arranged in the display region A21 in the display screen of each transmission terminal 10. In this manner, the user of the information providing device 30 can stop transmission of the display data by easy operation of pressing the stop button B32.

Moreover, according to the processes illustrated in FIGS. 28, 30 and 31, sharing the display screen (display data) of the information providing device 30 among the transmission terminals 10, the display data can be distributed to the other transmission terminals 10 via a desired transmission terminal 10 by bringing the information providing device 30 close to the desired transmission terminal 10, which eliminates the need for procedures for connecting a network at each conference base and allows display data to be shared easily. Furthermore, since it is not necessary to provide other basic network technologies for sharing screens, it is possible to prevent an increase in the cost.

Still further, as a result of requesting to start or stop distribution by each transmission terminal 10 to a relay device 40, the need for a delay device 40 to manage which transmission terminal 10 (information providing device 30) is in a state transmitting display data is eliminated. As a result, although display data transmitting from an information providing device 30 needs to be limited to that of one base, the processing load on the relay devices 40 is reduced the relay devices 40 can relay to more transmission terminals 10, which can improve the scalability.

GUIs for instructing to start or stop transmission displayed on information providing devices 30 are not limited to buttons (start button B31, stop button B32), and a menu may be displayed for a user to select therefrom. Alternatively, labels may be attached to the start button B31 and the stop button B32 (for example, "start sharing screen" to the start button B31 and "stop sharing screen" to the stop button B32) so that the content of processing generated by pressing the button is displayed. Sill alternatively, text data such as "screen can be shared" and "screen is being shared" may be displayed together with the start button B31 and the stop button B32, respectively.

As described above, according to the embodiment, a user brings an information providing device 30 close to the MFP 80, instructs the MFP 80 to scan a document to be scanned from the information providing device 30 to make the MFP 80 scan the document to be scanned. The information providing device 30 then receives data of the scanned document from the MFP 80, saves the received data in a predetermined storage location in the information providing device 30, and registers the file name of the data and the storage location thereof in association with each other in the file management table in the information providing device 30. The user then brings the information providing device 30 close to a transmission terminal 10, selects data to be shared from the storage location in the information providing device 30, and transmits the selected data to the transmission terminal 10. The transmission terminal 10 shares the data at an electronic conference. Thus, according to the embodiment, data obtained by scanning by the MFP 80 can be easily shared.

For example, while an example of a remote conference between places separated by a great distance is presented in the embodiment described above, the embodiment is not limited thereto, and may also be used in a remote conference between conference rooms separated by a short distance such as conference rooms in the same building or in a remote conference even between places in the same room which natural voice cannot reach from each other in addition to the case of places that are actually separated by a great distance. Thus, a remote conference is not a conference where participants meet face-to-face but refers to a conference conducted through a transmission system. A conference also includes such a case as a one-on-one meeting.

Furthermore, while a case in which a teleconference is conducted by using the transmission system 1 is described in the embodiment, the embodiment is not limited thereto but may also be used for a meeting, ordinary conversation between family members or friends or one-way presentation of information.

According to another aspect, an information providing device capable of communicating with an image forming device, a data managing device, and a transmission terminal, the information providing device comprising:

a storage unit;

a communication unit that receives, from the image forming device, a file control program for performing file control of data generated by the image forming device; and a program managing unit that stores the file control program in the storage unit, wherein
the file control program causes a computer to execute:
transmitting a forming instruction to instruct the image forming device to perform image forming;
receiving, from the image forming device, storage location information indicating the data managing device that stores data obtained by image forming by the image forming device and indicating a storage location in the data managing device from the image forming device;
generating, in the storage unit, management information in which identification information of the data is associated with the storage location information;
receiving the data stored in the storage location indicated by the storage location information from the data managing device; and
transmitting the received data to the transmission terminal.

According to the present invention, an effect that image data formed by an image forming device can be easily shared is produced.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus.

Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information providing device capable of communicating with a transmission terminal which performs video communication with one or more counterpart transmission terminals, the information providing device comprising:
one or more communication interfaces;
a display configured to display image data; and
circuitry configured to execute a process in conjunction with the transmission terminal after the information providing device establishes a connection with the transmission terminal via the one or more communication interfaces, the process including obtaining the image data when it is displayed on the display and transmitting the displayed image data to the transmission terminal via the one or more communication interfaces, such that the transmission terminal is performing the video communication with the counterpart transmission terminal prior to the image data being transmitted to the transmission terminal, and when the image data is transmitted to the transmission terminal, the transmission terminal transmits the image data to be caused to automatically display the image data as part of an ongoing video communication with the counterpart transmission terminal based on an input received from a user at the information providing device.

2. The information providing device according to claim 1, the one or more communication interfaces being further configured to receive the image data from an image forming apparatus prior to the image data being displayed on the display.

3. The information providing device of claim 1, wherein after the information providing device establishes the connection with the transmission terminal via the one or more communication interfaces, the circuitry is configured to obtain a program stored at the transmission terminal to execute the process for obtaining the image data when it is displayed on the display and transmitting the displayed image data to the transmission terminal via the one or more communication interfaces.

4. The information providing device of claim 1, wherein the process includes displaying an input reception area to receive the input from the user on the display of the information providing device in conjunction with displaying the image data, and when the information providing device detects a user input at the input reception area, the process begins transmitting the displayed image data to the transmission terminal via the one or more communication interfaces.

5. The information providing device of claim 1, wherein the one or more communication interfaces provide wireless communication between the information providing device and the transmission terminal.

6. A transmission terminal which performs video communication with a counterpart transmission terminal, comprising:
one or more communication interfaces configured to receive image data from an information providing device; and
circuitry configured to execute a process in conjunction with the information providing device after the information providing device establishes a connection with the transmission terminal via the one or more communication interfaces, the process including receiving the image data when it is displayed on a display of the information providing device via the one or more communication interfaces and transmitting the image data to the counterpart transmission terminal during video communication, such that the transmission terminal is performing the video communication with the counterpart transmission terminal prior to the image data being transmitted to the counterpart transmission terminal, and when the information providing device sends the image data to the transmission terminal, the transmission terminal transmits the image data to be caused to automatically display the image data as part of the ongoing video communication with the counterpart transmission terminal based on an input received from a user at the information providing device.

7. The transmission terminal according to claim 6, the circuitry being configured to control display of the image data on a display device.

8. The transmission terminal according to claim 7, wherein the circuitry controls display of the image data and captured image data sent from the counterpart transmission terminal on the display device.

9. A non-transitory computer readable medium including computer executable instructions, wherein the instructions, when executed by an information providing device capable of communicating with an transmission terminal, cause the information providing device to perform a method comprising:
displaying image data on a display;
executing a process in conjunction with the transmission terminal after the information providing device establishes a connection with the transmission terminal via one or more communication interfaces, the process including obtaining the image data when it is displayed on the display and transmitting the displayed image data to the transmission terminal via the one or more communication interfaces, such that the transmission terminal is performing the video communication with the counterpart transmission terminal prior to the image data being transmitted to the counterpart transmission terminal, and when the information providing device sends the image data to the transmission terminal, the transmission terminal transmits the image data to be caused to automatically display the image data as part of the ongoing video communication with the counterpart transmission terminal based on an input received from a user at the information providing device.

10. The non-transitory computer readable medium according to claim 9, the method further comprising receiving the image data from an image forming apparatus prior to displaying the image data on the display.

11. A non-transitory computer readable medium including computer executable instructions, wherein the instructions, when executed by a transmission terminal which performs video communication with a counterpart transmission terminal, cause the transmission terminal to perform a method comprising:
receiving, by one or more communication interfaces, image data from an information providing device; and
executing a process in conjunction with the information providing device after the information providing device establishes a connection with the transmission terminal via the one or more communication interfaces, the process including receiving the image data when it is displayed on a display of the information providing device via the one or more communication interfaces and transmitting the image data to the counterpart transmission terminal during video communication, such that the transmission terminal is performing the video communication with the counterpart transmission terminal prior to the image data being transmitted to the counterpart transmission terminal, and when the information providing device sends the image data to the transmission terminal, the transmission terminal transmits the image data to be caused to automatically display the image data as part of the ongoing video communication with the counterpart transmission terminal based on an input received from a user at the information providing device.

12. The non-transitory computer readable medium according to claim 11, the method further comprising controlling the image data to be displayed on a display device.

13. The non-transitory computer readable medium according to claim 12, the method further comprising controlling displaying of the image data and captured image data sent from the counterpart transmission terminal on the display device.

\* \* \* \* \*